(12) United States Patent
Shi et al.

(10) Patent No.: US 10,701,591 B2
(45) Date of Patent: Jun. 30, 2020

(54) DATA TRANSMISSION METHOD, APPARATUS, AND SYSTEM

(71) Applicant: Huawei Technologies Co., Ltd., Shenzhen (CN)

(72) Inventors: Xiaoli Shi, Shanghai (CN); Haiyan Luo, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 12 days.

(21) Appl. No.: 16/189,347

(22) Filed: Nov. 13, 2018

(65) Prior Publication Data

US 2019/0104439 A1 Apr. 4, 2019

Related U.S. Application Data

(63) Continuation of application No. PCT/CN2016/082131, filed on May 13, 2016.

(51) Int. Cl.
*H04W 28/08* (2009.01)
*H04W 76/27* (2018.01)
*H04W 72/04* (2009.01)
*H04W 76/12* (2018.01)
*H04W 84/04* (2009.01)
*H04W 84/12* (2009.01)
*H04W 88/06* (2009.01)

(52) U.S. Cl.
CPC ......... *H04W 28/085* (2013.01); *H04W 28/08* (2013.01); *H04W 76/27* (2018.02); *H04W 72/0426* (2013.01); *H04W 76/12* (2018.02); *H04W 84/042* (2013.01); *H04W 84/12* (2013.01); *H04W 88/06* (2013.01)

(58) Field of Classification Search
CPC ... H04W 12/06; H04W 84/042; H04W 84/06; H04W 92/02
See application file for complete search history.

(56) References Cited

U.S. PATENT DOCUMENTS 7,814,195 B2 * 10/2010 Dacosta ............ H04L 29/06027
370/466
2016/0183322 A1 6/2016 Huang et al.

FOREIGN PATENT DOCUMENTS

| CN | 102918925 B | 2/2013 |
|---|---|---|
| CN | 104349419 A | 2/2015 |
| CN | 104796227 A | 7/2015 |

(Continued)

OTHER PUBLICATIONS

"QoS handling of offloaded bearer in LWA," 3GPP TSG-RAN2 Meeting #91bis, Malmo, Sweden, R2-154371, 3rd Generation Partnership Project, Valbonne, France(Oct. 5-9, 2015).

(Continued)

*Primary Examiner* — Chandrahas B Patel
(74) *Attorney, Agent, or Firm* — Leydig, Voit & Mayer, Ltd.

(57) ABSTRACT

A data transmission method includes: sending, by the cellular access device, non-cellular access device addition request information to the non-cellular access device; receiving, by the cellular access device, non-cellular access device addition response information sent by the non-cellular access device; and receiving, by the cellular access device, the uplink data sent by the UE by using the resource of the non-cellular network.

20 Claims, 13 Drawing Sheets

(56) References Cited

FOREIGN PATENT DOCUMENTS

| CN | 105144830 A | 12/2015 |
|----|-------------|---------|
| WO | 2015165051 A1 | 11/2015 |

OTHER PUBLICATIONS

"Protocol architecture enhancement and Xw bearer establishment for eLWA," 3GPP TSG RAN WG2 Meeting #93bis, Dubrovnik, Croatia, R2-162181, 3rd Generation Partnership Project, Valbonne, France (Apr. 11-15, 2016).
"Discussion on Support of UL Bearer in Rel-14 LWA ," 3GPP TSG RAN WG2 Meeting #93bis, Dubrovnik, Croatia, R2-162183, 3rd Generation Partnership Project, Valbonne, France (Apr. 11-15, 2016).
"Uplink data transmission over WLAN for LWA," 3GPP TSG-RAN WG2 Meeting #93bis, Dubrovnik, Croatia, R2-162531, 3rd Generation Partnership Project, Valbonne, France (Apr. 11-15, 2016).
"Details of operations for LTE-WLAN aggregation," 3GPP TSG-RAN WG3 Meeting #89, Beijing, China, R3-151375,3rd Generation Partnership Project, Valbonne, France (Aug. 24-28, 2015).
"3rd Generation Partnership Project; Technical Specification Group Radio Access Network; Evolved Universal Terrestrial Radio Access Network (E-UTRAN) and Wireless LAN (WLAN); Xw application protocol (XwAP) (Release 13)," 3GPP TS 36.463 V2.0.0, pp. 1-93, 3rd Generation Partnership Project, Valbonne, France (Mar. 2016).
"3rd Generation Partnership Project; Technical Specification Group Radio Access Network; Evolved Universal Terrestrial Radio Access Network (E-UTRAN) and Wireless Lan (WLAN); Xw interface user plane protocol(Release 13)," 3GPP TS 36.465 V13.0.0, pp. 1-14, 3rd Generation Partnership Project, Valbonne, France (Mar. 2016).
"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2(Release 13)," 3GPP TS 36.300 V13.3.0, pp. 1-295, 3rd Generation Partnership Project, Valbonne, France (Mar. 2016).
"UL bearer identification for eLWA," 3GPP TSG-RAN3 Meeting #92, Nanjing, China, R3-161197, pp. 1-3, 3rd Generation Partnership Project, Valbonne, France (May 23-27, 2016).
"3rd Generation Partnership Project; Technical Specification Group Radio Access Network; Evolved Universal Terrestrial Radio Access Network (E-UTRAN) and Wireless LAN (WLAN); Xw data transport(Release 13)," 3GPP TS 36.464 V13.0.0, pp. 1-7, 3rd Generation Partnership Project, Valbonne, France (Mar. 2016).
"3rd Generation Partnership Project; Technical Specification Group Radio Access Network; Evolved Universal Terrestrial Radio Access Network (E-UTRAN) and Wireless LAN (WLAN); Xw application protocol (XwAP) (Release 13)," 3GPP TS 36.463 V13.0.0, pp. 1-92, 3rd Generation Partnership Project, Valbonne, France (Mar. 2016).
CN/201680085649.5, Office Action, dated Apr. 7, 2020.

* cited by examiner

DATA TRANSMISSION METHOD, APPARATUS, AND SYSTEM

CROSS-REFERENCE TO RELATED APPLICATIONS

This application is a continuation of International Application No. PCT/CN2016/082131, filed on May 13, 2016, the disclosure of which is hereby incorporated by reference in its entirety.

TECHNICAL FIELD

Embodiments of the present invention relate to the communications field, and in particular, to a data transmission method, apparatus, and system.

BACKGROUND

With the popularization of intelligent mobile terminals and rapid development of mobile applications, scenarios in which users use mobile data increase greatly in number. As a result, it becomes increasingly difficult for existing networks to satisfy requirements of increasing mobile data traffic. Generally, a wireless cellular network has advantages such as wide coverage and support for high-speed movement but also has disadvantages such as a low data transmission rate, a high price, and high transmission power. A wireless local area network (WLAN) has advantages such as a high data transmission rate, a low price, and low transmission power but also has disadvantages such as small coverage.

To satisfy requirements of increasing mobile data traffic, a wireless cellular network technology and a WLAN technology are integrated in the prior art, and a WLAN is used to offload data traffic from a wireless cellular network, to improve user experience and implement efficient and cost-efficient communication. Currently, the 3rd Generation Partnership Project (3GPP) provides a Long Term Evolution-wireless local area network aggregation (LWA) technology. A general packet radio service tunnelling protocol-user plane (GTP-U) tunnel can be established between a base station and a wireless local area network termination (WT). The GTP-U tunnel is used to transmit data, to implement integration of the wireless cellular network technology and the WLAN technology and implement a WLAN offloading technology.

However, only downlink data can be transmitted in the existing LWA technology. When user equipment (UE) needs to send uplink data, offloaded data cannot be transmitted to the base station by using the GTP-U tunnel established between the base station and the WT.

SUMMARY

Embodiments of the present invention provide a data transmission method, apparatus, and system. A non-cellular access device can allocate a resource of a non-cellular network to UE, so that the UE sends uplink data to a cellular access device by using the non-cellular access device.

The following technical solutions are used in the embodiments of the present invention to achieve the foregoing objective.

According to a first aspect, an embodiment of the present invention provides a data transmission method, including: first, sending, by a cellular access device, non-cellular access device addition request information used to instruct a non-cellular access device to allocate a resource of a non-cellular network to user equipment UE to the non-cellular access device, where the non-cellular access device addition request information includes at least a first tunnel endpoint allocated to the UE, the first tunnel endpoint includes a first tunnel endpoint identifier TEID and a first transport layer address, and the first tunnel endpoint is used to indicate a data transmission destination in an uplink data transmission path; next, receiving, by the cellular access device, non-cellular access device addition response information sent by the non-cellular access device, where the non-cellular access device addition response information includes at least a second tunnel endpoint allocated for a bearer to which data of the UE belongs, the second tunnel endpoint includes a second tunnel endpoint identifier TEID and a second transport layer address, and the second tunnel endpoint is used to indicate a data transmission destination in a downlink data transmission path; and finally, receiving, by the cellular access device, uplink data sent by the UE by using the non-cellular access device.

In the data transmission method provided in this embodiment of the present invention, the cellular access device sends the non-cellular access device addition request information used to instruct the non-cellular access device to allocate the resource of the non-cellular network to the UE to the non-cellular access device, to enable the non-cellular access device to allocate the resource to the UE, where an uplink transmission tunnel is established for the UE, and a downlink transmission tunnel is established for the bearer to which the data of the UE belongs, and the UE sends the uplink data to the cellular access device by using the allocated resource of the non-cellular network, thereby resolving a problem that only downlink data can be transmitted in an existing LWA technology.

Further, the non-cellular access device addition request information further includes a media access control MAC address of the UE and a to-be-added-bearer list, the to-be-added-bearer list includes a third tunnel endpoint, a radio access bearer identifier ERAB ID, and a radio bearer service quality priority, the third tunnel endpoint includes a third TEID and a third transport layer address, the third tunnel endpoint is used to indicate a data transmission destination in data transmission for traffic control in uplink, and the radio bearer service quality priority is a quality of service QoS priority corresponding to radio bearer information.

Further, the non-cellular access device addition response information further includes an addible-bearer list, and the addible-bearer list includes a radio bearer identifier.

Further, after the receiving, by the cellular access device, non-cellular access device addition response information sent by the non-cellular access device, and before the receiving, by the cellular access device, uplink data sent by the UE by using the non-cellular access device, the method further includes:

first, sending, by the cellular access device, radio resource control RRC connection configuration information including Long Term Evolution-wireless local area network aggregation LWA configuration information to the UE; next, receiving, by the cellular access device, RRC connection configuration complete information sent by the UE; and finally, receiving, by the cellular access device, non-cellular access device association complete information sent by the UE.

In the data transmission method provided in this embodiment of the present invention, after the non-cellular access device allocates the resource of the non-cellular network to the UE, the UE accesses the cellular access device and is associated with the non-cellular access device, to ensure that the uplink data sent by the UE to the cellular access device can be normally transmitted.

Optionally, after the receiving, by the cellular access device, RRC connection configuration complete information sent by the UE, and before the receiving, by the cellular access device, non-cellular access device association complete information sent by the UE, the method further includes:

receiving, by the cellular access device, non-cellular access device connection status information that is sent by the UE and that is used to indicate a connection status between the UE and the non-cellular access device.

In the data transmission method provided in this embodiment of the present invention, due to different user preferences, terminal configurations or access network discovery and selection function (ANDSF) policies, the UE may fail to be associated with the non-cellular access device. Therefore, the UE can further send the non-cellular access device connection status information used to indicate the connection status between the UE and the non-cellular access device to the cellular access device.

Further, a type Type of the uplink data that is received by the cellular access device and that is sent by the UE by using the non-cellular access device is a type number of uplink transmission data corresponding to a PDCP protocol.

According to a second aspect, an embodiment of the present invention provides a data transmission method, including:

receiving, first by a non-cellular access device, non-cellular access device addition request information that is sent by a cellular access device and that is used to instruct the non-cellular access device to allocate a resource of a non-cellular network to user equipment UE, where the non-cellular access device addition request information includes at least a first tunnel endpoint allocated for the UE, the first tunnel endpoint includes a first tunnel endpoint identifier TEID and a first transport layer address, and the first tunnel endpoint is used to indicate a data transmission destination in an uplink data transmission path; and then sending, by the non-cellular access device, non-cellular access device addition response information to the cellular access device, where the non-cellular access device addition response information includes at least a second tunnel endpoint allocated for a bearer to which data of the UE belongs, the second tunnel endpoint includes a second tunnel endpoint identifier TEID and a second transport layer address, and the second tunnel endpoint is used to indicate a data transmission destination in a downlink data transmission path.

In the data transmission method provided in this embodiment of the present invention, the non-cellular access device receives the non-cellular access device addition request information that is sent by the cellular access device and that is used to instruct the non-cellular access device to allocate the resource of the non-cellular network to the UE, and allocates the resource of the non-cellular network to the UE, where an uplink transmission tunnel is established for the UE, and a downlink transmission tunnel is established for the bearer to which the data of the UE belongs, so that the UE sends uplink data to the cellular access device by using the allocated resource of the non-cellular network, thereby resolving a problem that only downlink data can be transmitted in an existing LWA technology.

According to a third aspect, an embodiment of the present invention provides a data transmission method, including:

sending, by user equipment UE, uplink data to a cellular access device by using a non-cellular access device, where a resource of a non-cellular network is allocated by the non-cellular access device to the UE.

In the data transmission method provided in this embodiment of the present invention, the cellular access device sends non-cellular access device addition request information used to instruct the non-cellular access device to allocate the resource of the non-cellular network to the UE to the non-cellular access device, to enable a non-access device to allocate the resource to the UE, where an uplink transmission tunnel is established for the UE, and a downlink transmission tunnel is established for the bearer to which the data of the UE belongs, and the UE sends the uplink data to the cellular access device by using the allocated resource of the non-cellular network, thereby resolving a problem that only downlink data can be transmitted in an existing LWA technology.

Further, before the sending, by user equipment UE, uplink data to a cellular access device by using a non-cellular access device, the method further includes:

first, receiving, by the UE, radio resource control RRC connection configuration information that is sent by the cellular access device and that includes Long Term Evolution-wireless local area network aggregation LWA configuration information; next, sending, by the UE, RRC connection configuration complete information to the cellular access device; and finally, after the UE associates the UE and the non-cellular access device, sending, by the UE, non-cellular access device association complete information to the cellular access device.

In the data transmission method provided in this embodiment of the present invention, after the non-cellular access device allocates the resource of the non-cellular network to the UE, the UE accesses the cellular access device and is associated with the non-cellular access device, to ensure that the uplink data sent by the UE to the cellular access device can be normally transmitted.

Optionally, after the sending, by the UE, RRC connection configuration complete information to the cellular access device, and before the sending, by the UE, non-cellular access device association complete information to the cellular access device, the method further includes:

sending, by the UE, non-cellular access device connection status information used to indicate a connection status between the UE and the non-cellular access device to the cellular access device.

In the data transmission method provided in this embodiment of the present invention, due to different user preferences, terminal configurations or ANDSF policies, the UE may fail to be associated with the non-cellular access device. Therefore, the UE can further send the non-cellular access device connection status information used to indicate the connection status between the UE and the non-cellular access device to the cellular access device.

Further, a type Type of the uplink data sent by the UE by using the non-cellular access device is a type number of uplink transmission data corresponding to a PDCP protocol.

According to a fourth aspect, an embodiment of the present invention provides a data transmission method, including:

first, sending, by a cellular access device, non-cellular access device addition request information used to instruct a non-cellular access device to allocate a resource of a non-cellular network to user equipment UE to the non-cellular access device, where the non-cellular access device addition request information includes at least a to-be-added-bearer list, and the to-be-added-bearer list includes a data radio bearer identifier DRB ID or an evolved packet system EPS bearer identifier; next, receiving, by the cellular access device, non-cellular access device addition response information sent by the non-cellular access device, where the non-cellular access device addition response information includes at least a second tunnel endpoint allocated for a bearer to which data of the UE belongs, the second tunnel endpoint includes a second tunnel endpoint identifier TEID and a second transport layer address, and the second tunnel endpoint is used to indicate a data transmission destination in a downlink data transmission path; and finally, receiving, by the cellular access device, uplink data sent by the UE by using the non-cellular access device.

In the data transmission method provided in this embodiment of the present invention, the cellular access device sends the non-cellular access device addition request information used to instruct the non-cellular access device to allocate the resource of the non-cellular network to the UE to the non-cellular access device, to enable a non-access device to allocate the resource to the UE, and the UE sends the uplink data to the cellular access device by using the allocated resource of the non-cellular network, thereby resolving a problem that only downlink data can be transmitted in an existing LWA technology.

Further, after the receiving, by the cellular access device, non-cellular access device addition response information sent by the non-cellular access device, and before the receiving, by the cellular access device, uplink data sent by the UE by using the non-cellular access device, the method further includes:

first, sending, by the cellular access device, radio resource control RRC connection configuration information including Long Term Evolution-wireless local area network aggregation LWA configuration information to the UE; next, receiving, by the cellular access device, RRC connection configuration complete information sent by the UE; and finally, receiving, by the cellular access device, non-cellular access device association complete information sent by the UE.

In the data transmission method provided in this embodiment of the present invention, after the non-cellular access device allocates the resource of the non-cellular network to the UE, the UE accesses the cellular access device and is associated with the non-cellular access device, to ensure that the uplink data sent by the UE to the cellular access device can be normally transmitted.

Optionally, after the receiving, by the cellular access device, RRC connection configuration complete information sent by the UE, and before the receiving, by the cellular access device, non-cellular access device association complete information sent by the UE, the method further includes:

receiving, by the cellular access device, non-cellular access device connection status information that is sent by the UE and that is used to indicate a connection status between the UE and the non-cellular access device.

In the data transmission method provided in this embodiment of the present invention, due to different user preferences, terminal configurations or ANDSF policies, the UE may fail to be associated with the non-cellular access device. Therefore, the UE can further send the non-cellular access device connection status information used to indicate the connection status between the UE and the non-cellular access device to the cellular access device.

According to a fifth aspect, an embodiment of the present invention provides a data transmission method, including:

receiving, by a non-cellular access device, non-cellular access device addition request information that is sent by a cellular access device and that is used to instruct the non-cellular access device to allocate a resource of a non-cellular network to user equipment UE, where the non-cellular access device addition request information includes at least a to-be-added-bearer list, and the to-be-added-bearer list includes a data radio bearer identifier DRB ID or an evolved packet system EPS bearer identifier; and sending, by the non-cellular access device, non-cellular access device addition response information to the cellular access device, where the non-cellular access device addition response information includes at least a second tunnel endpoint allocated for a bearer to which data of the UE belongs, the second tunnel endpoint includes a second tunnel endpoint identifier TEID and a second transport layer address, and the second tunnel endpoint is used to indicate a data transmission destination in a downlink data transmission path.

In the data transmission method provided in this embodiment of the present invention, the non-cellular access device receives the non-cellular access device addition request information that is sent by the cellular access device and that is used to instruct the non-cellular access device to allocate the resource of the non-cellular network to the UE, and allocates the resource of the non-cellular network to the UE, so that the UE sends uplink data to the cellular access device by using the allocated resource of the non-cellular network, thereby resolving a problem that only downlink data can be transmitted in an existing LWA technology.

According to a sixth aspect, an embodiment of the present invention provides a cellular access device, including a sending module and a receiving module.

The sending module is configured to send non-cellular access device addition request information used to instruct a non-cellular access device to allocate a resource of a non-cellular network to user equipment UE to the non-cellular access device, where the non-cellular access device addition request information includes at least a first tunnel endpoint allocated for the UE, the first tunnel endpoint includes a first tunnel endpoint identifier TEID and a first transport layer address, and the first tunnel endpoint is used to indicate a data transmission destination in an uplink data transmission path.

The receiving module is configured to: after the sending module sends the non-cellular access device addition request information to the non-cellular access device, receive non-cellular access device addition response information sent by the non-cellular access device, where the non-cellular access device addition response information includes at least a second tunnel endpoint allocated for a bearer to which data of the UE belongs, the second tunnel endpoint includes a second tunnel endpoint identifier TEID and a second transport layer address, and the second tunnel endpoint is used to indicate a data transmission destination in a downlink data transmission path; and receive uplink data sent by the UE by using the non-cellular access device.

For the technical effect of the cellular access device provided in this embodiment of the present invention, refer to the foregoing technical effect of the cellular access device described in the data transmission method performed by the cellular access device in the first aspect. Details are not described herein again.

Further, the sending module is further configured to: after the receiving module receives the non-cellular access device addition response information sent by the non-cellular access device, and before the receiving module receives the uplink data sent by the UE by using the non-cellular access device, send radio resource control RRC connection configuration information including Long Term Evolution-wireless local area network aggregation LWA configuration information to the UE. The receiving module is further configured to: after the sending module sends the radio resource control RRC connection configuration information to the UE, receive RRC connection configuration complete information sent by the UE; and receive non-cellular access device association complete information sent by the UE.

Optionally, the receiving module is further configured to: after the receiving module receives the RRC connection configuration complete information sent by the UE, and before the receiving module receives the non-cellular access device association complete information sent by the UE, receive non-cellular access device connection status information that is sent by the UE and that is used to indicate a connection status between the UE and the non-cellular access device.

According to a seventh aspect, an embodiment of the present invention provides a non-cellular access device, including a receiving module and a sending module.

The receiving module is configured to receive non-cellular access device addition request information that is sent by a cellular access device and that is used to instruct the non-cellular access device to allocate a resource of a non-cellular network to user equipment UE, where the non-cellular access device addition request information includes at least a first tunnel endpoint allocated for the UE, the first tunnel endpoint includes a first tunnel endpoint identifier TEID and a first transport layer address, and the first tunnel endpoint is used to indicate a data transmission destination in an uplink data transmission path.

The sending module is configured to: after the receiving module receives the non-cellular access device addition request information sent by the cellular access device, send non-cellular access device addition response information to the cellular access device, where the non-cellular access device addition response information includes at least a second tunnel endpoint allocated for a bearer to which data of the UE belongs, the second tunnel endpoint includes a second tunnel endpoint identifier TEID and a second transport layer address, and the second tunnel endpoint is used to indicate a data transmission destination in a downlink data transmission path.

For the technical effect of the non-cellular access device provided in this embodiment of the present invention, refer to the foregoing technical effect of the non-cellular access device described in the data transmission method performed by the non-cellular access device in the second aspect. Details are not described herein again.

According to an eighth aspect, an embodiment of the present invention provides user equipment UE, including a sending module.

The sending module is configured to send uplink data to a cellular access device by using a non-cellular access device, where a resource of a non-cellular network is allocated by the non-cellular access device to the UE.

For the technical effect of the UE provided in this embodiment of the present invention, refer to the foregoing technical effect of the UE described in the data transmission method performed by the UE in the third aspect. Details are not described herein again.

Further, the UE further includes a receiving module and an association module.

The receiving module is configured to: before the sending module sends the uplink data to the cellular access device by using the non-cellular access device, receive radio resource control RRC connection configuration information that is sent by the cellular access device and that includes Long Term Evolution-wireless local area network aggregation LWA configuration information. The sending module is further configured to: after the receiving module receives the radio resource control RRC connection configuration information sent by the cellular access device, send RRC connection configuration complete information to the cellular access device. The association module is configured to associate the UE and the non-cellular access device. The sending module is further configured to: after the association module associates the UE and the non-cellular access device, send non-cellular access device association complete information to the cellular access device.

Optionally, the sending module is further configured to: after the sending module sends the RRC connection configuration complete information to the cellular access device, and before the sending module sends the non-cellular access device association complete information to the cellular access device, send non-cellular access device connection status information used to indicate a connection status between the UE and the non-cellular access device to the cellular access device.

According to a ninth aspect, an embodiment of the present invention provides a cellular access device, including a sending module and a receiving module.

The sending module is configured to send non-cellular access device addition request information used to instruct a non-cellular access device to allocate a resource of a non-cellular network to user equipment UE to the non-cellular access device, where the non-cellular access device addition request information includes at least a to-be-added-bearer list, and the to-be-added-bearer list includes a data radio bearer identifier DRB ID or an evolved packet system EPS bearer identifier.

The receiving module is configured to: after the sending module sends the non-cellular access device addition request information to the non-cellular access device, receive non-cellular access device addition response information sent by the non-cellular access device, where the non-cellular access device addition response information includes at least a second tunnel endpoint allocated for a bearer to which data of the UE belongs, the second tunnel endpoint includes a second tunnel endpoint identifier TEID and a second transport layer address, and the second tunnel endpoint is used to indicate a data transmission destination in a downlink data transmission path; and receive uplink data sent by the UE by using the resource of the non-cellular network.

For the technical effect of the cellular access device provided in this embodiment of the present invention, refer to the foregoing technical effect of the cellular access device described in the data transmission method performed by the cellular access device in the fourth aspect. Details are not described herein again.

Further, the sending module is further configured to: after the receiving module receives the non-cellular access device addition response information sent by the non-cellular access device, and before the receiving module receives the uplink data sent by the UE by using the non-cellular access device, send radio resource control RRC connection configuration information including Long Term Evolution-wireless local area network aggregation LWA configuration information to the UE. The receiving module is further configured to: after the sending module sends the radio resource control RRC connection configuration information to the UE, receive RRC connection configuration complete information sent by the UE; and receive non-cellular access device association complete information sent by the UE.

Optionally, the receiving module is further configured to: after the receiving module receives the RRC connection configuration complete information sent by the UE, and before the receiving module receives the non-cellular access device association complete information sent by the UE, receive non-cellular access device connection status information that is sent by the UE and that is used to indicate a connection status between the UE and the non-cellular access device.

According to a tenth aspect, an embodiment of the present invention provides a non-cellular access device, including a receiving module and a sending module.

The receiving module is configured to receive non-cellular access device addition request information that is sent by a cellular access device and that is used to instruct the non-cellular access device to allocate a resource of a non-cellular network to user equipment UE, where the non-cellular access device addition request information includes at least a to-be-added-bearer list, and the to-be-added-bearer list includes a data radio bearer identifier DRB ID or an evolved packet system EPS bearer identifier.

The sending module is configured to: after the receiving module receives the non-cellular access device addition request information sent by the cellular access device, send non-cellular access device addition response information to the cellular access device, where the non-cellular access device addition response information includes at least a second tunnel endpoint allocated for a bearer to which data of the UE belongs, the second tunnel endpoint includes a second tunnel endpoint identifier TEID and a second transport layer address, and the second tunnel endpoint is used to indicate a data transmission destination in a downlink data transmission path.

For the technical effect of the non-cellular access device provided in this embodiment of the present invention, refer to the foregoing technical effect of the non-cellular access device described in the data transmission method performed by the non-cellular access device in the fifth aspect. Details are not described herein again.

According to an eleventh aspect, an embodiment of the present invention provides a cellular access device, including a memory, a processor, a communications interface, and a system bus, where the memory, the processor, and the communications interface are connected by using the system bus, the memory is configured to store a computer instruction, and the processor is configured to execute the computer instruction stored in the memory, to enable the cellular access device to perform the data transmission method in the first aspect or the data transmission method in the fourth aspect.

For the technical effect of the cellular access device provided in this embodiment of the present invention, refer to the foregoing technical effect of the cellular access device described in the data transmission method performed by the cellular access device in the first aspect or the fourth aspect. Details are not described herein again.

According to a twelfth aspect, an embodiment of the present invention provides a non-cellular access device, including a memory, a processor, a communications interface, and a system bus, where the memory, the processor, and the communications interface are connected by using the system bus, the memory is configured to store a computer instruction, and the processor is configured to execute the computer instruction stored in the memory, to enable the non-cellular access device to perform the data transmission method in the second aspect or the data transmission method in the fifth aspect.

For the technical effect of the non-cellular access device provided in this embodiment of the present invention, refer to the foregoing technical effect of the non-cellular access device described in the data transmission method performed by the non-cellular access device in the second aspect or the fifth aspect. Details are not described herein again.

According to a thirteenth aspect, an embodiment of the present invention provides UE, including a memory, a processor, a communications interface, and a system bus, where the memory, the processor, and the communications interface are connected by using the system bus, the memory is configured to store a computer instruction, and the processor is configured to execute the computer instruction stored in the memory, to enable the UE to perform the data transmission method in the third aspect.

For the technical effect of the UE provided in this embodiment of the present invention, refer to the foregoing technical effect of the UE described in the data transmission method performed by the UE in the third aspect. Details are not described herein again.

According to a fourteenth aspect, an embodiment of the present invention provides a data transmission system, including the cellular access device in the eleventh aspect, the non-cellular access device in the twelfth aspect, and the user equipment UE in the thirteenth aspect.

In the data transmission system provided in this embodiment of the present invention, the cellular access device sends the non-cellular access device addition request information used to instruct the non-cellular access device to allocate the resource of the non-cellular network to the UE to the non-cellular access device, and the UE sends the uplink data to the cellular access device by using the allocated resource of the non-cellular network, thereby resolving a problem that only downlink data can be transmitted in an existing LWA technology.

BRIEF DESCRIPTION OF DRAWINGS

To describe the technical solutions in the embodiments of the present invention, the following briefly describes the accompanying drawings required for describing the embodiments. Apparently, the accompanying drawings in the following description show merely some embodiments of the present invention.

DESCRIPTION OF EMBODIMENTS

The following describes the technical solutions in the embodiments of the present invention with reference to the accompanying drawings in the embodiments of the present invention. Apparently, the described embodiments are merely some but not all of the embodiments of the present invention.

In addition, the terms "system" and "network" may be used interchangeably in this specification. The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be noted that the technical solutions in the present invention may be applied to various wireless cellular network communications systems, for example, a Global System for Mobile Communications (GSM), a Code Division Multiple Access (CDMA) system, a Wideband Code Division Multiple Access (WCDMA) system, a general packet radio service (GPRS) system, a Long Term Evolution (LTE) system, and a Universal Mobile Telecommunications System (UMTS). This is not limited in the present invention.

Figure 1:
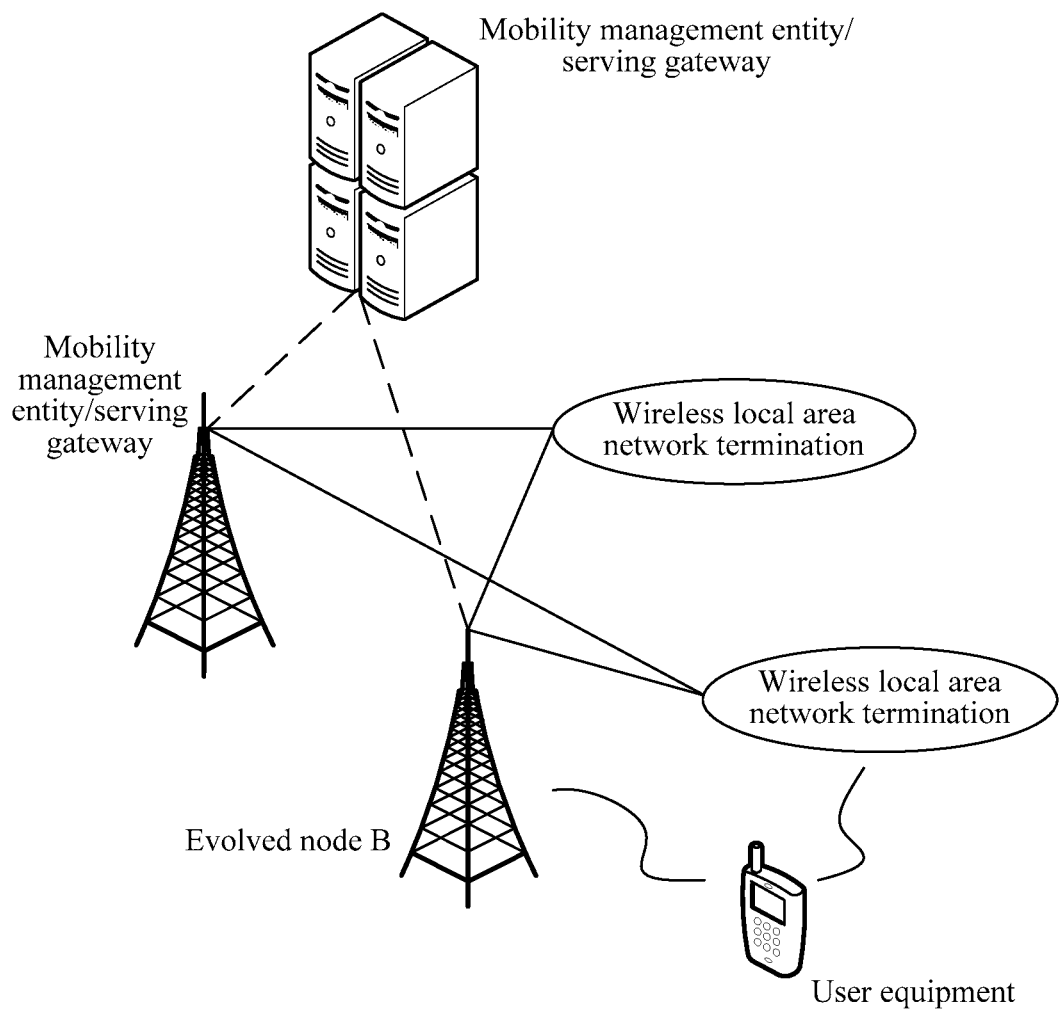
FIG. 1 is an architectural diagram of a communications system based on an LWA technology according an embodiment of the present invention.

An architectural diagram of a communications system based on an LWA technology provided in an embodiment of the present invention is shown in FIG. 1. The communications system includes three network elements, namely, an evolved packet core network (EPC) device, an evolved node B (eNode B), and a WLAN termination (WT). The EPC is responsible for the part of a core network, and includes a mobility management entity (MME) and a serving gateway (S-GW). The MME performs signaling processing, and the S-GW performs data processing. The eNode B and the WT are responsible for the part of an access network, which is also referred to as an evolved universal terrestrial radio access network (E-UTRAN). The eNode B may be generally referred to as a cellular access device. The WT may be generally referred to as a non-cellular access device. A data transmission method provided in this embodiment of the present invention is performed among the cellular access device, the non-cellular access device, and UE. In addition, the data transmission method provided in this embodiment of the present invention is applicable to two scenarios in which the cellular access device and the non-cellular access device are co-located and in which the cellular access device and the non-cellular access device are not co-located. The present invention is not limited thereto.

In the embodiments of the present invention, the UE may also be referred to as a mobile terminal, mobile user equipment, or the like. The UE may communicate with one or more core networks by using a radio access network (RAN). For example, the UE may be a mobile terminal, for example, a mobile phone (or referred to as a "cellular" phone) or a computer with a mobile terminal. For example, the UE may be a portable, pocket-sized, handheld, computer built-in, or in-vehicle mobile apparatus, which exchanges voice and/or data with the radio access network. This is not limited in the present invention.

In this embodiment of the present invention, the cellular access device may be a base station device, for example, a base transceiver station (BTS) in a GSM or in CDMA, or may be a node B in WCDMA, or may be an eNB in LTE. The present invention is not limited thereto. The cellular access device may be alternatively a control node in various access network nodes, for example, a radio network controller (RNC) in a UMTS, or a controller that manages a plurality of small cells.

In this embodiment of the present invention, the non-cellular access device may be a wireless local area network access point (WLAN AP), or may be a wireless local area network access controller (WLAN AC), or another separately deployed physical WLAN termination (WT). The WT may be located at the WLAN AP, or may be located at the WLAN AC, or may be an independent entity. One WT may manage at least one WLAN AP. Data transmission between the WT and the WLAN AP may be implemented by using various transmission methods. The present invention is not limited thereto.

In this embodiment of the present invention, a non-cellular network may also be referred to as a non-cellular system, or may be simply referred to as "non-cellular". "Non-cellular" that appears in this embodiment of the present invention represents a non-cellular network or a non-cellular system.

For the non-cellular network, a user-side terminal device is a station (STA). For a wireless cellular network, the user-side terminal device is UE. In a scenario of a heterogeneous network that includes a non-cellular network and a wireless cellular network in this embodiment of the present invention, the user-side terminal device may be referred to as UE or a STA and can receive services from two networks, and is generally referred to as UE below for ease of description.

It should be noted that there may be three types of configuration structures of protocol stacks of the eNB, the UE, and the WT in this embodiment of the present invention. In the first type, the protocol stacks of the eNB and the UE include an LWAAP protocol layer. In the second type, the protocol stacks of the eNB, the UE, and the WT include an LWAAP protocol layer. In the third type, the protocol stacks of the UE and the WT include an LWAEP protocol layer. The three types of configuration structures of protocol stacks of the eNB, the UE, and the WT are described below first.

Figure 2:
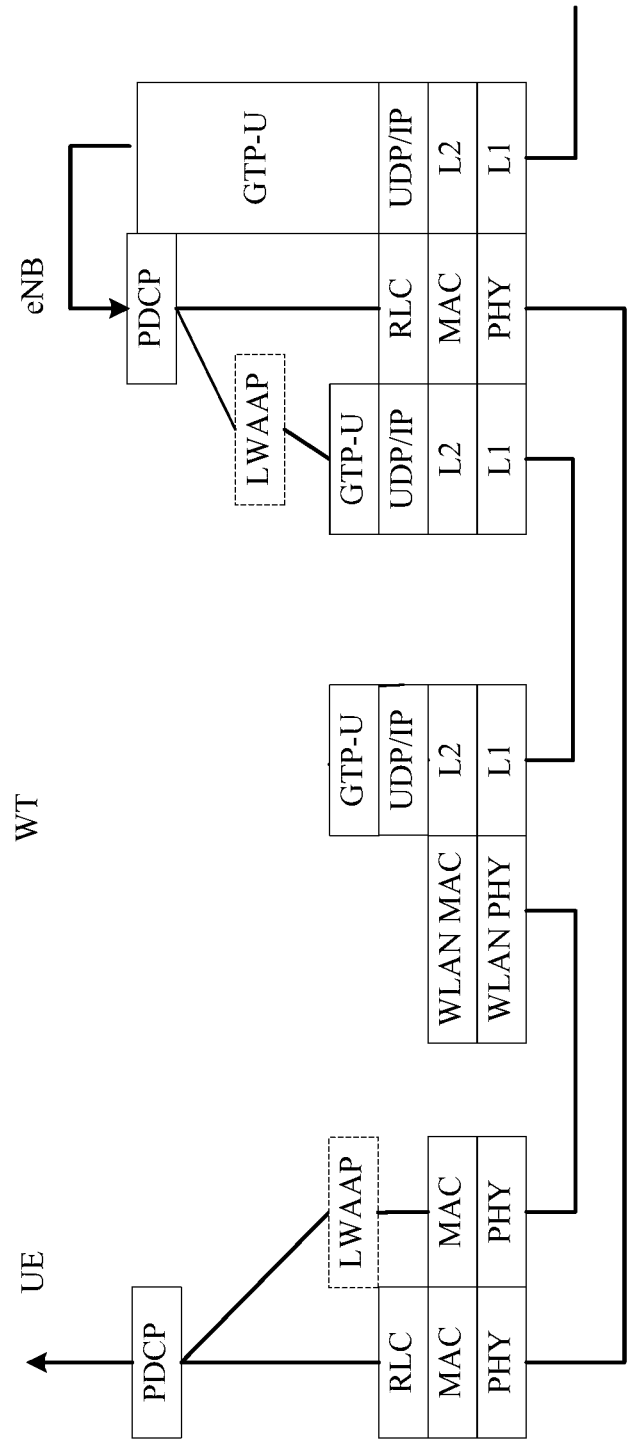
FIG. 2 is a schematic diagram of a configuration structure in which protocol stacks of an eNB and UE include an LWAAP protocol layer according an embodiment of the present invention.

The case in which the protocol stacks of the eNB and the UE include an LWAAP protocol layer is shown in FIG. 2. The case in which the protocol stacks of the eNB and the UE include an LWAAP protocol layer is the same as that of an existing configuration structure of protocol stacks.

Figure 3:
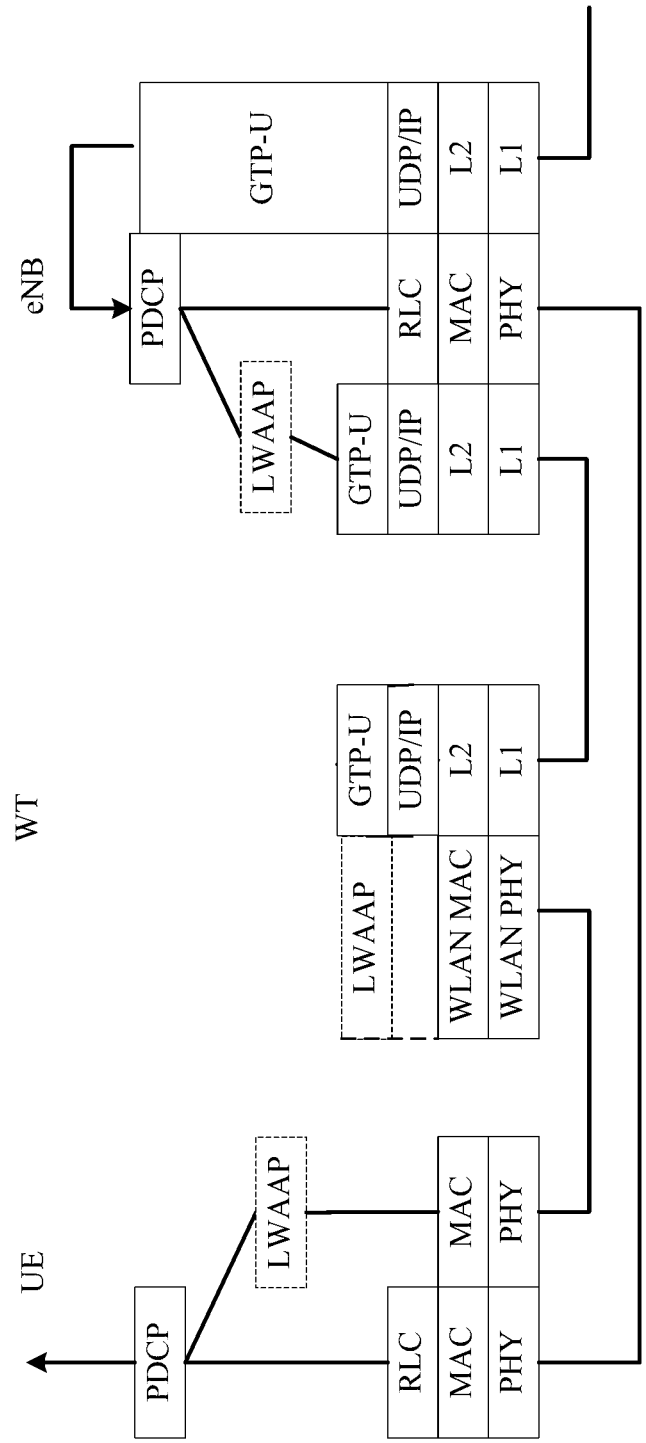
FIG. 3 is a schematic diagram of a configuration structure in which protocol stacks of an eNB, UE, and a WT include an LWAAP protocol layer according an embodiment of the present invention.

The case in which the protocol stacks of the eNB, the UE, and the WT include an LWAAP protocol layer is shown in FIG. 3.

First, the configuration structure of the protocol stack of the eNB is described.

An eNB protocol stack may include a first eNB protocol stack and a second eNB protocol stack. The first eNB protocol stack is configured to implement data processing of communication with the user equipment on a side of the eNB. The second eNB protocol stack is configured to implement data processing of communication with the WT on the side of the eNB. As the first eNB protocol stack, for example, any existing protocol stack that can implement communication between the eNB and the user equipment falls within the protection scope. The second eNB protocol stack may be directly aggregated on at least one protocol layer of the first eNB protocol stack by using an interface.

The first eNB protocol stack and the second eNB protocol stack may include a user-plane protocol stack, or may include a user-plane protocol stack and a control-plane protocol stack. For example, as shown in FIG. 3, the first eNB protocol stack may include the following protocol layers: a packet data convergence protocol (PDCP) layer, a radio link control (RLC) layer, a media access control (MAC) layer, and a physical (PHY) layer. The second eNB protocol stack may include a user-plane protocol stack, or may include a control-plane protocol stack. A transport layer of the user-plane protocol stack in the present invention uses a newly defined Xw interface user protocol (Xw user, Xw-U). A specific Xw-U protocol may use a GPRS tunnelling protocol-user plane GPRS tunnel (GTP-U) protocol. A transport layer of the control-plane protocol stack in the present invention uses a stream control transmission protocol (SCTP), a transmission control protocol (TCP) or a user datagram protocol (UDP). An application layer of the control-plane protocol stack uses a newly defined Xw interface application protocol (XwAP). The second eNB protocol stack may be aggregated at the PDCP of the first eNB protocol stack. The first eNB protocol stack may perform offloading at the PDCP. Optionally, the second eNB protocol stack further has an LWAAP protocol layer. The LWAAP protocol layer is located above a GTP-U layer.

Next, the configuration structure of the protocol stack of the WT is described below.

The WT protocol stack has a first WT protocol stack and a second WT protocol stack. The first WT protocol stack is configured to implement data processing of communication with the eNB at the WLAN WT. The second WT protocol stack is configured to implement data processing of communication with the user equipment on a side of the WT. Specifically, if the WT is located at the WLAN AP, the communication between the WT and the WLAN AP is implemented internally. If the WT is independent of the WLAN AP, protocol stacks for the communication between the WT and the WLAN AP are defined by the Institute of Electrical and Electronics Engineers (IEEE).

The first WT protocol stack may include a user-plane protocol stack, or may include a control-plane protocol stack and a user-plane protocol stack. A transport layer of the user-plane protocol stack in the present invention uses Xw-U. A specific Xw-U protocol may use a GTP-U protocol. A transport layer of the control-plane protocol stack in the present invention uses an SCTP protocol. An application layer of the control-plane protocol stack uses a newly defined XwAP protocol. The second WT protocol stack may use, for example, an existing protocol stack for communication in a wireless local area network, for example, a WIFI protocol stack, a MAC layer, and a PHY layer. Optionally, the second WT protocol stack may further include a logic link control (LLC) layer. An LWAAP protocol layer further exists above the MAC layer. If there is an LLC layer, the LWAAP protocol layer is located above the LLC layer.

Finally, the configuration structure of the protocol stack of the user equipment is described.

A user equipment protocol stack may include a first user equipment protocol stack and a second user equipment protocol stack. The first user equipment protocol stack is configured to implement data processing of communication with the eNB on a side of the user equipment. The second user equipment protocol stack is configured to implement data processing of communication with the WT on a side of the user equipment. The second user equipment protocol stack is connected to at least one protocol layer in the first user equipment protocol stack. Specifically, the second user equipment protocol stack may include the following protocol layers: a MAC layer and a PHY layer. An LWAAP protocol layer may be further included above the MAC layer. Optionally, the second user equipment protocol stack may further include an LLC layer. If an LLC layer is included, the LWAAP protocol layer may be located above the LLC layer.

Figure 4:
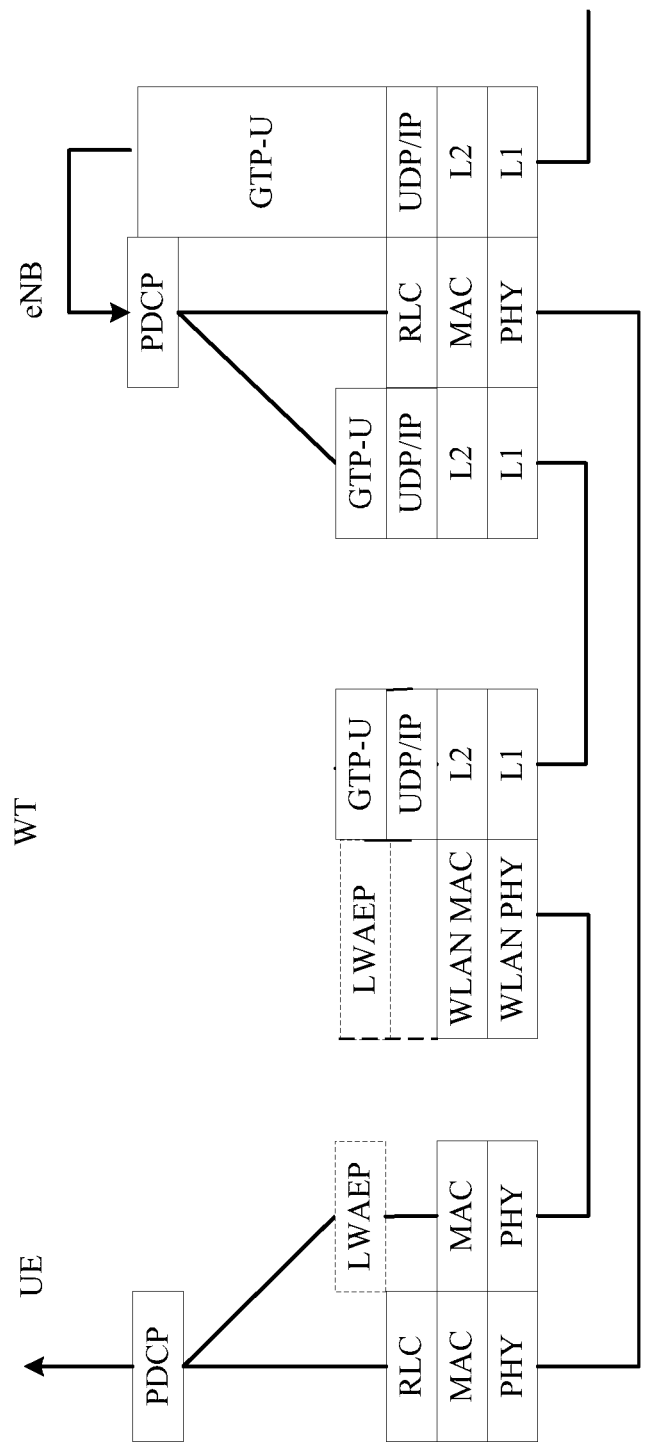
FIG. 4 is a schematic diagram of a configuration structure in which protocol stacks of UE and a WT include an LWAEP protocol layer according an embodiment of the present invention.

The case in which the protocol stacks of the UE and the WT include an LWAEP protocol layer is shown in FIG. 4.

First, the configuration structure of the protocol stack of the eNB is described.

The configuration structure of the protocol stack of the eNB is similar to the configuration structure of the protocol stack of the eNB in FIG. 3, and a difference lies in that the second eNB protocol stack does not have an LWAAP protocol layer.

Next, the configuration structure of the protocol stack of the WT is described.

The configuration structure of the protocol stack of the WT is similar to the configuration structure of the protocol stack of the WT in FIG. 3, and a difference lies in that a new protocol layer (LWAEP) further exists above the MAC layer. If there is an LLC layer, the new protocol layer is located above the LLC layer.

Finally, the configuration structure of the protocol stack of the user equipment is described.

The configuration structure of the protocol stack of the user equipment is similar to the configuration structure of the protocol stack of the user equipment in FIG. 3, and a difference lies in that a newly added adaptation protocol layer (LWAEP) may be further included on the MAC layer. Optionally, the second user equipment protocol stack may further include an LLC layer. If an LLC layer is included, the newly added adaptation protocol layer may be located at the LLC layer.

Embodiment 1

Figure 5:
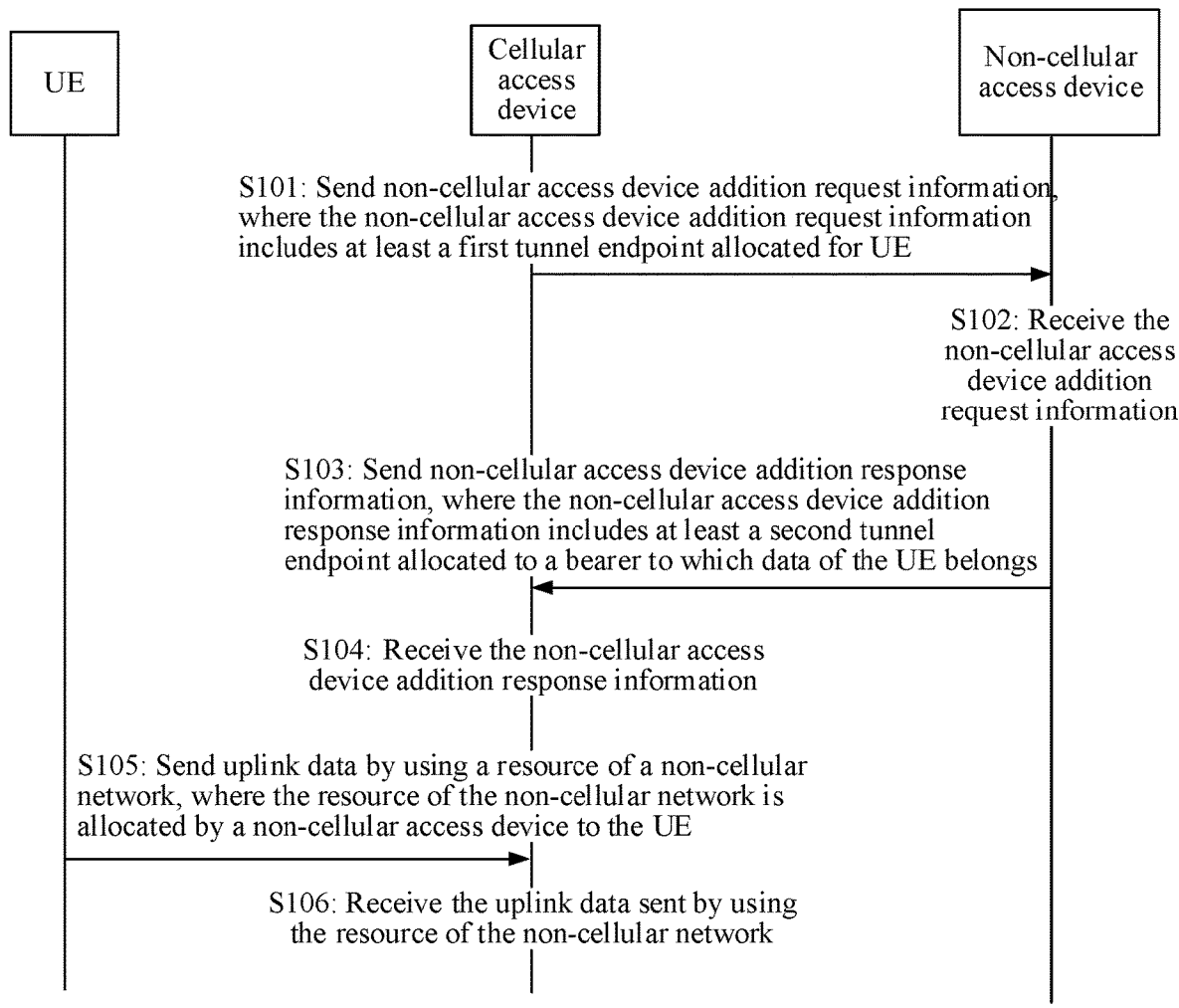
FIG. 5 is a schematic flowchart 1 of a data transmission method according to Embodiment 1 of the present invention.

This embodiment of the present invention provides a data transmission method. Based on the configuration structure in which the protocol stacks of the eNB and the UE include an LWAAP protocol layer shown in FIG. 2, as shown in FIG. 5, the method includes the following steps.

S101: A cellular access device sends non-cellular access device addition request information to a non-cellular access device.

The non-cellular access device addition request information is used to instruct the non-cellular access device to allocate a resource of a non-cellular network to the user equipment UE, the non-cellular access device addition request information includes at least a first tunnel endpoint allocated for the UE, the first tunnel endpoint includes a first tunnel endpoint identifier (TEID) and a first transport layer address, and the first tunnel endpoint is used to indicate a data transmission destination in an uplink data transmission path.

It may be understood that the first tunnel endpoint allocated for the UE is a first tunnel endpoint allocated by the cellular access device to each UE. A plurality of UEs correspond to a plurality of first tunnel endpoints. The first tunnel endpoint allocated for each UE is unique.

Further, the non-cellular access device addition request information further includes a media access control (MAC) address of the UE and a to-be-added-bearer list, the to-be-added-bearer list includes a third tunnel endpoint, an evolved universal terrestrial radio access network radio access bearer identifier (EUTRAN-Radio Access Bearer Identifier, ERAB ID), and a radio bearer service quality priority, the third tunnel endpoint includes a third TEID and a third transport layer address, the third tunnel endpoint is used to indicate a data transmission destination in data transmission for traffic control in uplink, and the radio bearer service quality priority is a quality of service (QoS) priority corresponding to radio bearer information. Specifically, the MAC address of the UE, the third tunnel endpoint, the ERAB ID, and the radio bearer service quality priority are consistent.

It should be noted that the MAC address of the UE may be indicated when the UE reports a capability, or may be reported to the cellular access device by the UE sending a separate message. The present invention is not limited thereto.

It should be further added that before step S101 is performed, the cellular access device can configure that the UE performs measurement and reporting of non-cellular access devices, so that the cellular access device selects, based on measurement results (for example, load of the non-cellular access devices or subscription information of the UE) that are reported by the UE and that are about the non-cellular access devices, to add a suitable non-cellular access device to perform LWA transmission.

S102: The non-cellular access device receives the non-cellular access device addition request information sent by the cellular access device.

a step corresponding to step S101.

S103: The non-cellular access device sends non-cellular access device addition response information to the cellular access device.

The non-cellular access device addition response information includes at least a second tunnel endpoint allocated for a bearer to which data of the UE belongs, the second tunnel endpoint includes a second tunnel endpoint identifier TEID and a second transport layer address, and the second tunnel endpoint is used to indicate a data transmission destination in a downlink data transmission path.

The non-cellular access device addition response information further includes an addible-bearer list, and the addible-bearer list includes a radio bearer identifier.

Specifically, the second tunnel endpoint and the radio bearer identifier are also consistent.

S104: The cellular access device receives the non-cellular access device addition response information sent by the non-cellular access device.

a step corresponding to step S103.

S105: The user equipment UE sends uplink data to the cellular access device by using the non-cellular access device, where a resource of a non-cellular network is allocated by the non-cellular access device to the UE.

Optionally, a type Type of the uplink data that is received by the cellular access device and that is sent by the UE by using the resource of the non-cellular network is a type number of uplink transmission data corresponding to a PDCP protocol.

If the uplink data that is received by the cellular access device and that is sent by the UE by using the resource of the non-cellular network does not carry the type number of the uplink transmission data, the cellular access device may directly process the uplink data after receiving the uplink data.

S106: The cellular access device receives the uplink data sent by the UE by using the non-cellular access device.

a step corresponding to step S105.

Specifically, for example, the cellular access device is an eNB, and the non-cellular access device is a WT. The foregoing step in which the user equipment UE sends the uplink data to the cellular access device by using the resource of the non-cellular network is described.

The UE sends an LWA protocol data unit (PDU), that is, a PDCP PDU to which an LWAAP is added, to the WT. After receiving an LWA PDU data packet, the WT first recognizes, based on the MAC address of the UE, the UE that sends the data packet, and then finds the first TEID (where the first TEID is a TEID allocated by the eNB for uplink data transmission during tunnel establishment, and because the MAC address of the UE corresponds to the first TEID, the first TEID may be directly found by using the MAC address of the UE) corresponding to the UE. An uplink-dedicated GTP-U tunnel is used to add a GTP-U header to the LWA PDU. An uplink-dedicated first TEID corresponding to the UE is filled in the header. After data is transmitted to the LWAAP protocol layer of the eNB, if the GTP-U header includes the type number of the uplink transmission data, it is first recognized, based on a PDU type in the GTP-U header (extended header), whether the LWA PDU has the type number of the uplink transmission data corresponding to the PDCP protocol. If the LWA PDU has the type number of the uplink transmission data corresponding to the PDCP protocol, the GTP-U header is deleted. If the GTP-U header does not include the type number of the uplink transmission data, the GTP-U header is directly deleted. Next, DRB bearer information in the LWAAP protocol layer is read, an LWAAP header is deleted, and the PDCP PDU is sent to a PDCP entity corresponding to a bearer identifier for processing.

Figure 6:
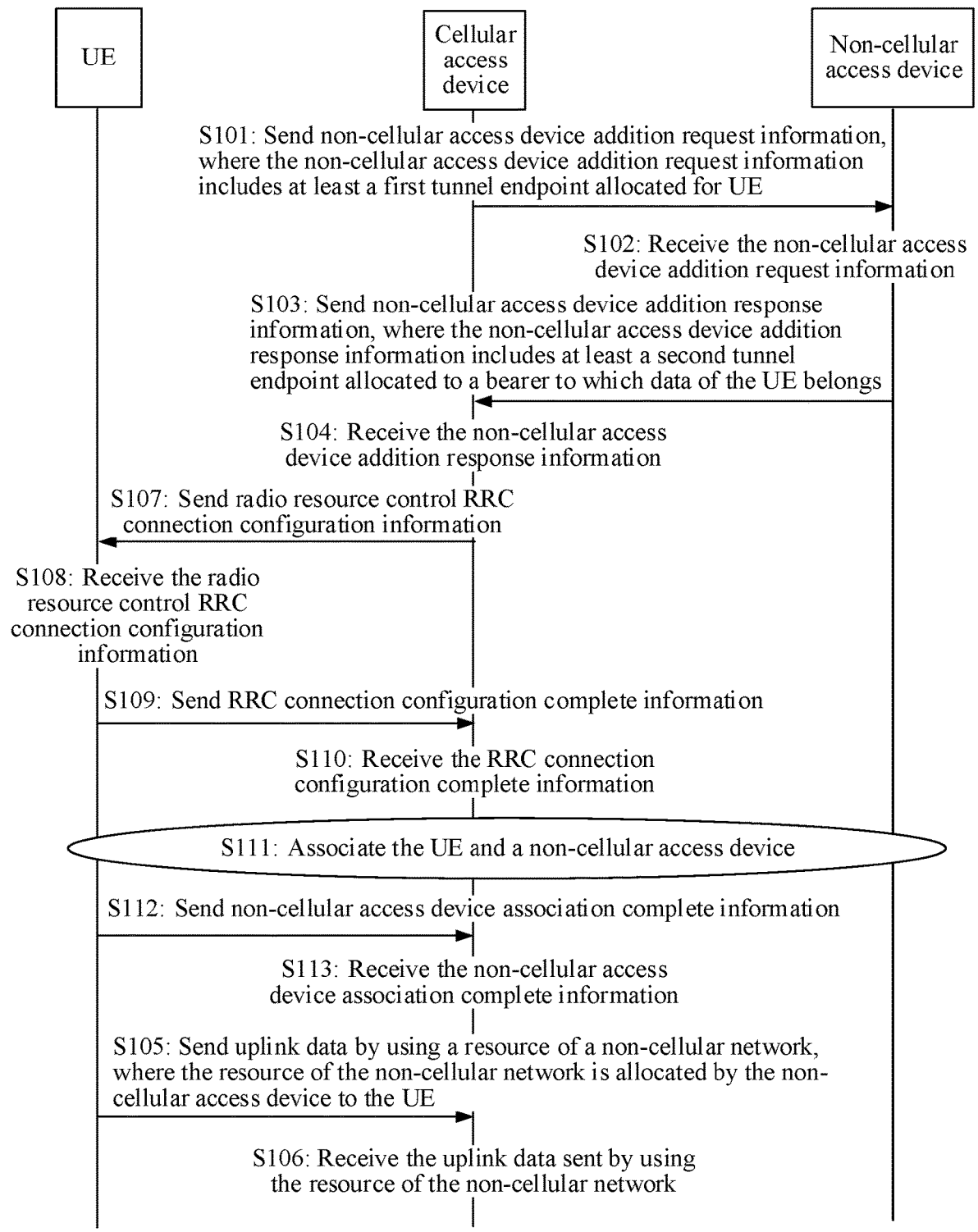
FIG. 6 is a schematic flowchart 2 of the data transmission method according to Embodiment 1 of the present invention.

Further, as shown in FIG. 6, before step S105 is performed, the data transmission method provided in this embodiment of the present invention further includes steps S107 to S113:

S107: The cellular access device sends radio resource control RRC connection configuration information to the UE.

The RRC connection configuration information includes Long Term Evolution-wireless local area network aggregation LWA configuration information, for example, a basic service set identifier (BSSID) list.

S108: The UE receives the radio resource control RRC connection configuration information sent by the cellular access device.

a step corresponding to step S107.

S109: The UE sends RRC connection configuration complete information to the cellular access device.

S110: The cellular access device receives the RRC connection configuration complete information sent by the UE.

a step corresponding to step S109.

S111: The UE associates the UE and the non-cellular access device.

Specifically, the step in which the UE associates the UE and the non-cellular access device specifically includes: first, discovering, by the UE, a specified non-cellular access device in a manner of intercepting a beacon (beacon) frame or sending a probe (Probe) frame, and then sequentially performing authentication and association (Association) on the non-cellular access device, to complete processes such as authentication, capability negotiation, and key derivation.

S112: The UE sends non-cellular access device association complete information to the cellular access device.

After the UE associates the UE and the non-cellular access device, the UE can further send the non-cellular access device association complete information to the cellular access device.

S113: The cellular access device receives the non-cellular access device association complete information sent by the UE.

a step corresponding to step S112.

Figure 7:
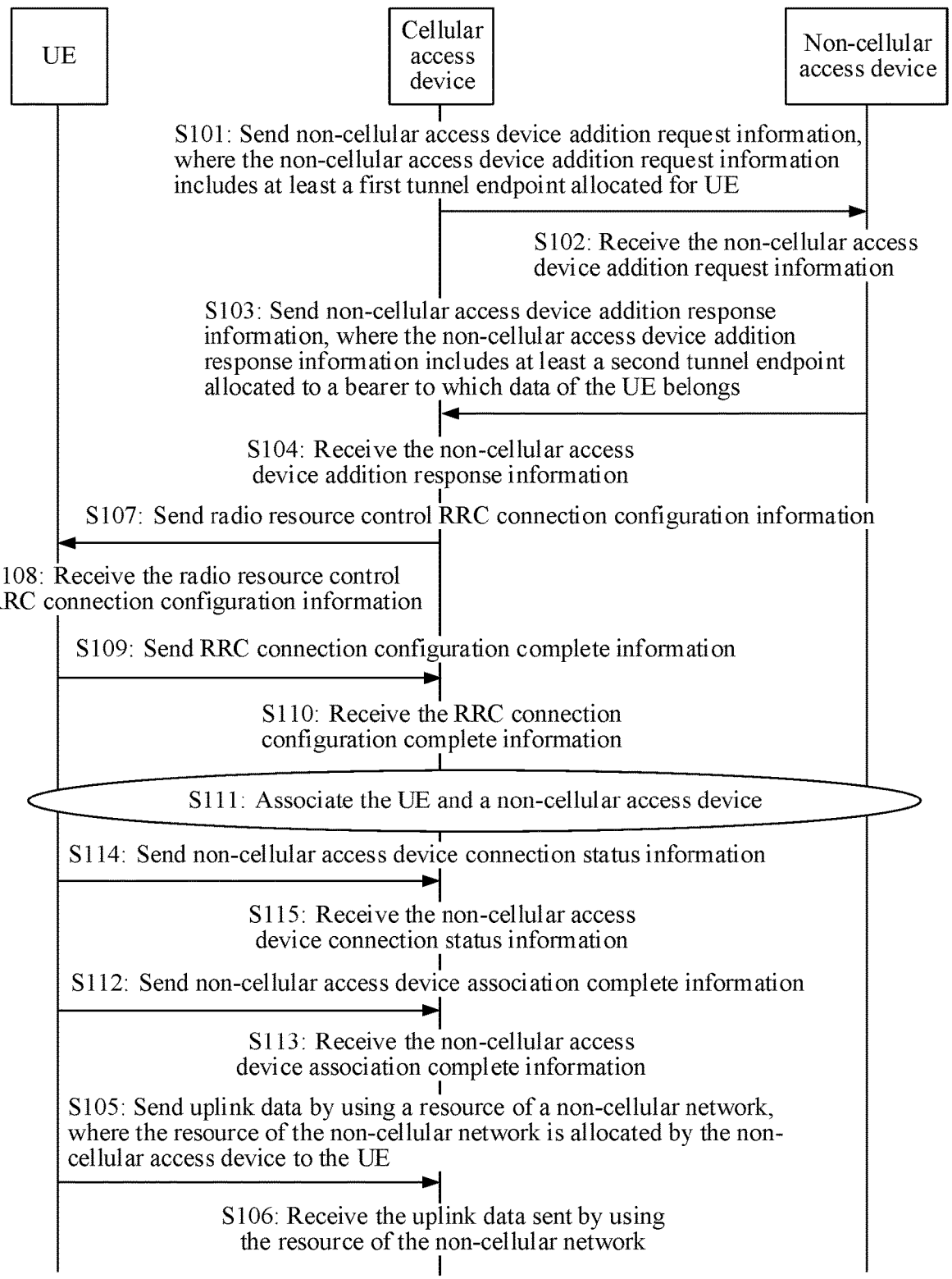
FIG. 7 is a schematic flowchart 3 of the data transmission method according to Embodiment 1 of the present invention.

Further, as shown in FIG. 7, before step S112 is performed, the data transmission method provided in this embodiment of the present invention may further include steps S114 and S115:

S114: The UE sends non-cellular access device connection status information to the cellular access device.

The non-cellular access device connection status information is used to indicate a connection status between the UE and the non-cellular access device.

If the UE cannot accept an LWA uplink data transmission request due to user preferences, terminal configurations or ANDSF policies or the UE is successfully associated, the UE can send the non-cellular access device connection status information which is used to indicate the connection status between the UE and the non-cellular access device to the cellular access device.

S115: The cellular access device receives the non-cellular access device connection status information sent by the UE.

a step corresponding to step S114.

For the data transmission method provided in this embodiment of the present invention, the method includes: sending, by the cellular access device, the non-cellular access device addition request information to the non-cellular access device, where the non-cellular access device addition request information is used to instruct the non-cellular access device to allocate the resource of the non-cellular network to the user equipment UE, the non-cellular access device addition request information includes at least the first tunnel endpoint allocated for the UE, the first tunnel endpoint includes the first tunnel endpoint identifier TEID and the first transport layer address, and the first tunnel endpoint is used to indicate the data transmission destination in the uplink data transmission path; receiving, by the cellular access device, the non-cellular access device addition response information sent by the non-cellular access device, where the non-cellular access device addition response information includes at least the second tunnel endpoint allocated for the bearer to which the data of the UE belongs, the second tunnel endpoint includes the second tunnel endpoint identifier TEID and the second transport layer address, and the second tunnel endpoint is used to indicate the data transmission destination in the downlink data transmission path; receiving, by the cellular access device, the uplink data sent by the UE by using the resource of the non-cellular network. Based on the descriptions of the foregoing embodiments, the cellular access device sends the non-cellular access device addition request information used to instruct the non-cellular access device to allocate the resource of the non-cellular network to the UE to the non-cellular access device, to enable a non-access device to allocate the resource to the UE, where an uplink transmission tunnel is established for the UE, and a downlink transmission tunnel is established for the bearer to which the data of the UE belongs, and the UE sends the uplink data to the cellular access device by using the allocated resource of the non-cellular network, thereby resolving a problem that only downlink data can be transmitted in an existing LWA technology.

Embodiment 2

Figure 8:
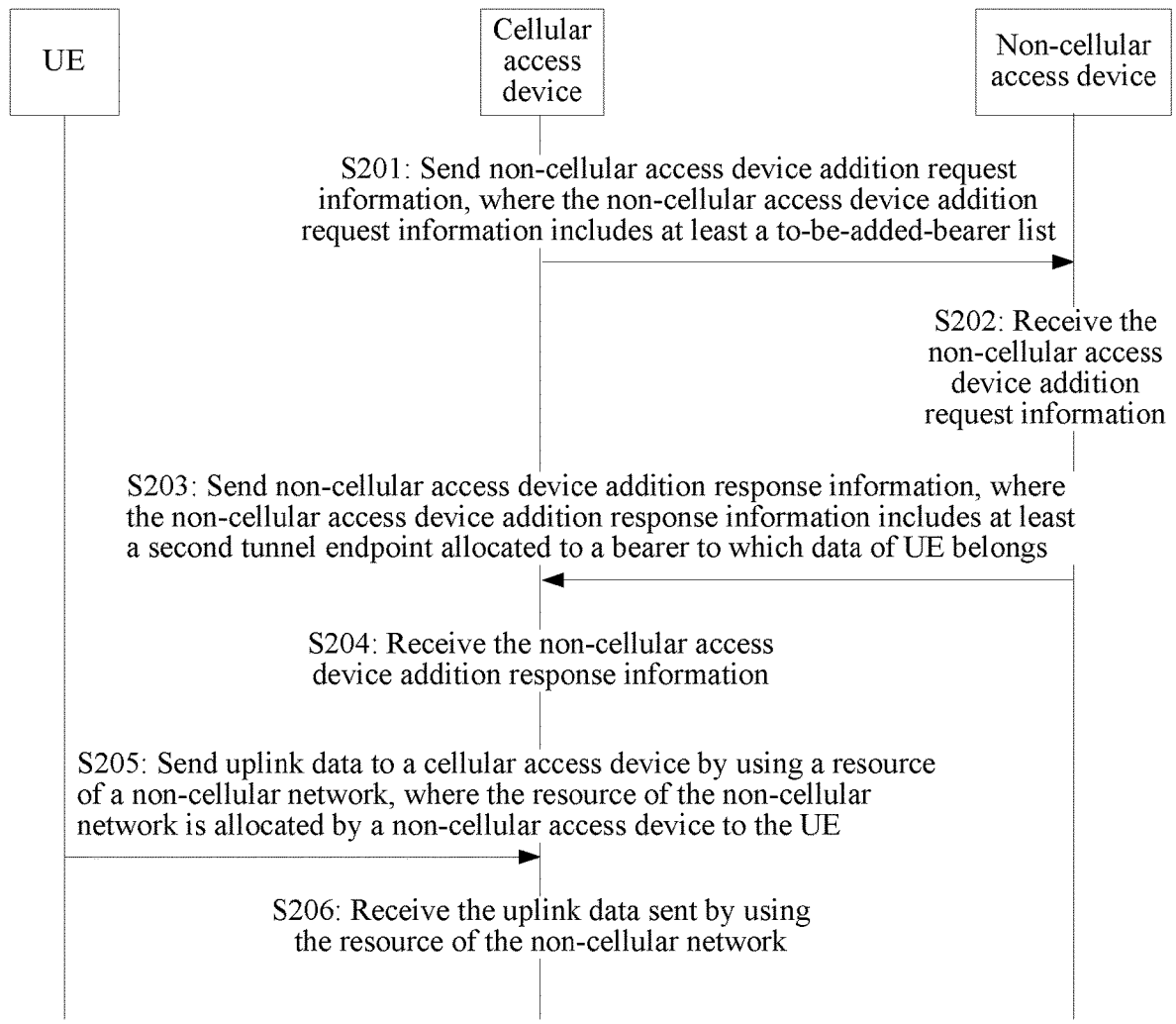
FIG. 8 is a schematic flowchart 1 of a data transmission method according to Embodiment 2 of the present invention.

This embodiment of the present invention provides a data transmission method. Based on the configuration structure in which the protocol stacks of the UE and the WT include an LWAEP protocol layer shown in FIG. 4, as shown in FIG. 8, the method includes:

S201: A cellular access device sends non-cellular access device addition request information to a non-cellular access device.

The non-cellular access device addition request information is used to instruct the non-cellular access device to allocate a resource of a non-cellular network to the user equipment UE, the non-cellular access device addition request information includes at least a to-be-added-bearer list, and the to-be-added-bearer list includes a data radio bearer identifier (DRB ID) or an evolved packet system (EPS) bearer identifier.

Optionally, the to-be-added-bearer list may further include an ERAB ID.

Therefore, the to-be-added-bearer list may include the DRB ID, or the EPS bearer identifier, or the DRB ID and the ERAB ID, or the EPS bearer identifier and the ERAB ID.

The non-cellular access device addition request information further includes a media access control MAC address of the UE, the to-be-added-bearer list further includes a third tunnel endpoint, the radio access bearer identifier ERAB ID, and a radio bearer service quality priority, the third tunnel endpoint includes a third TEID and a third transport layer address, the third tunnel endpoint is used to indicate a data transmission destination in data transmission for traffic control in uplink, and the radio bearer service quality priority is a QoS priority corresponding to radio bearer information. Specifically, the MAC address of the UE, the third tunnel endpoint, the ERAB ID, and the radio bearer service quality priority are consistent.

It should be noted that the MAC address of the UE may be indicated when the UE reports a capability, or may be reported to the cellular access device by the UE sending a separate message. The present invention is not limited thereto.

It should be further added that before step S101 is performed, the cellular access device can configure that the UE performs measurement and reporting of non-cellular access devices, so that the cellular access device selects, based on measurement results (for example, load of the non-cellular access devices or subscription information of the UE) that are reported by the UE and that are about the non-cellular access devices, to add a suitable non-cellular access device to perform LWA transmission.

S202: The non-cellular access device receives the non-cellular access device addition request information sent by the cellular access device.

a step corresponding to step S201.

S203: The non-cellular access device sends non-cellular access device addition response information to the cellular access device.

The non-cellular access device addition response information includes at least a second tunnel endpoint allocated for a bearer to which data of the UE belongs, the second tunnel endpoint includes a second tunnel endpoint identifier TEID and a second transport layer address, and the second tunnel endpoint is used to indicate a data transmission destination in a downlink data transmission path.

The non-cellular access device addition response information further includes an addible-bearer list, and the addible-bearer list includes a radio bearer identifier.

Specifically, the second tunnel endpoint and the radio bearer identifier are also consistent.

S204: The cellular access device receives the non-cellular access device addition response information sent by the non-cellular access device.

a step corresponding to step S203.

S205: The user equipment UE sends uplink data to the cellular access device by using a resource of a non-cellular network, where the resource of the non-cellular network is allocated by the non-cellular access device to the UE.

Optionally, a type Type of the uplink data that is received by the cellular access device and that is sent by the UE by using the resource of the non-cellular network is a type number of uplink transmission data corresponding to a PDCP protocol.

If the uplink data that is received by the cellular access device and that is sent by the UE by using the resource of the non-cellular network does not carry the type number of the uplink transmission data, the cellular access device may directly process the uplink data after receiving the uplink data.

S206: The cellular access device receives the uplink data sent by the UE by using the resource of the non-cellular network.

a step corresponding to step S205.

Specifically, for example, the cellular access device is an eNB, and the non-cellular access device is a WT. The foregoing step in which the user equipment UE sends uplink data to the cellular access device by using a resource of the non-cellular network is described.

After a DRB ID or an EPS bearer identifier is added to an uplink PDCP PDU offloaded by the UE by using an LWAEP protocol layer, an uplink LWAEP PDU (that is, a PDCP PDU to which an LWAEP is added) is sent to the WT. After receiving an LWAEP PDU data packet, the WT first recognizes (that is, performs recognition by using the MAC address of the UE) the UE that sends the data packet, and next, finds, based on the DRB ID or the EPS bearer identifier in the LWAEP, an ERAB ID corresponding to the UE (if the to-be-added-bearer list does not include an ERAB ID, the step may be omitted, and a third TEID of a corresponding tunnel is directly found based on the DRB ID or the EPS bearer identifier in the LWAEP), so that the third TEID (where the third TEID is a TEID allocated by the eNB to a specific bearer during tunnel establishment) of the tunnel corresponding to the bearer may be found based on the ERAB ID; or directly finds the third TEID of the tunnel corresponding to the bearer based on the DRB ID or the EPS bearer identifier. A header of the LWAEP is deleted, a GTP-U header is added, and the third TEID corresponding to the ERAB ID is filled in the header. A GTP-U tunnel corresponding to the ERAB ID is used to perform transmission. After data is transmitted to the eNB, the GTP-U header is deleted first, information about the ERAB ID of the corresponding bearer is found based on the third TEID in the header, and the PDCP PDU is then sent to a PDCP entity corresponding to the bearer identifier for processing.

Figure 9:
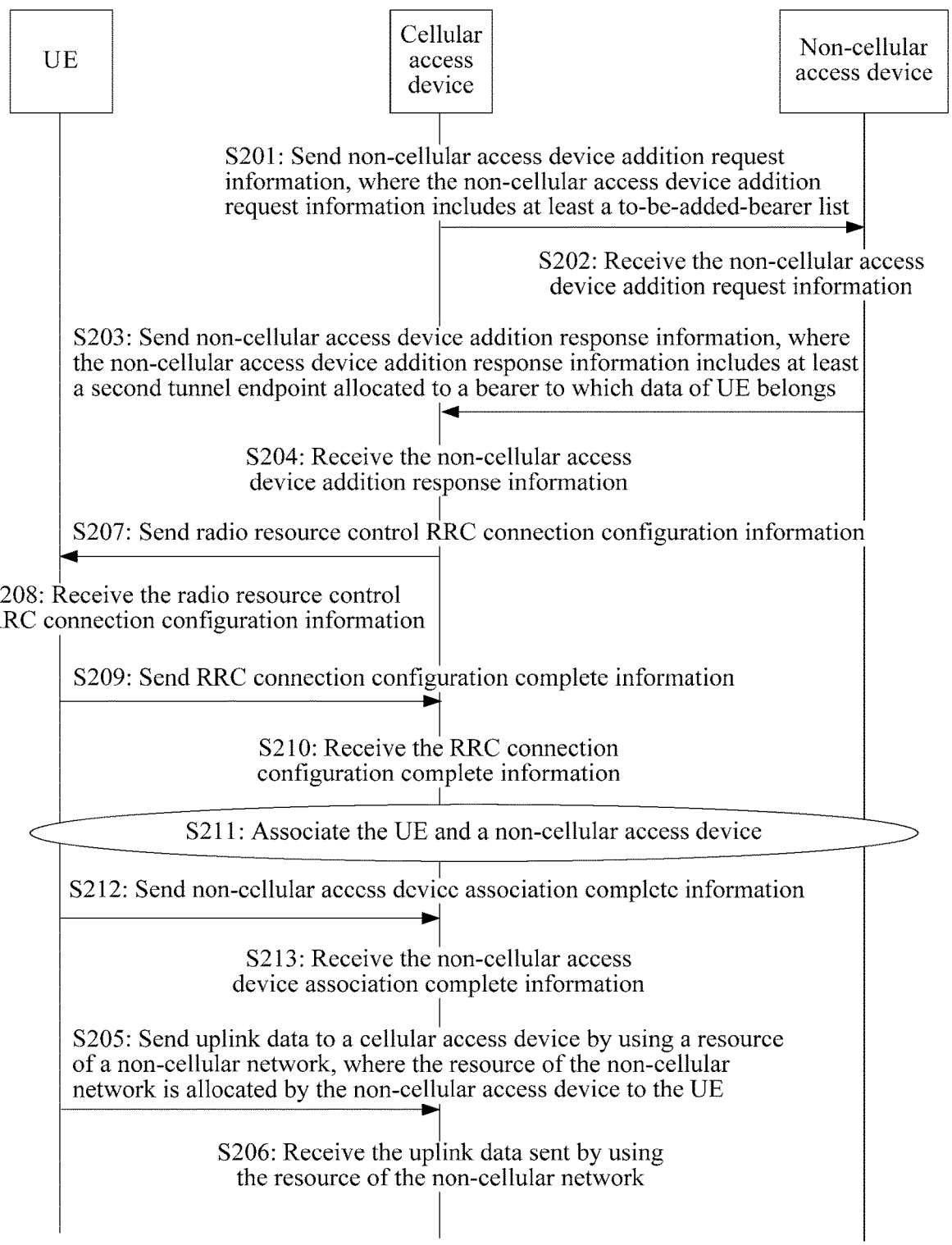
FIG. 9 is a schematic flowchart 2 of the data transmission method according to Embodiment 2 of the present invention.

Further, as shown in FIG. 9, before step S205 is performed, the data transmission method provided in this embodiment of the present invention further includes steps S207 to S213.

S207: The cellular access device sends radio resource control RRC connection configuration information to the UE.

The RRC connection configuration information includes Long Term Evolution-wireless local area network aggregation LWA configuration information.

S208: The UE receives the radio resource control RRC connection configuration information sent by the cellular access device.

S209: The UE sends RRC connection configuration complete information to the cellular access device.

S210: The cellular access device receives the RRC connection configuration complete information sent by the UE.

S211: The UE associates the UE and the non-cellular access device.

S212: The UE sends non-cellular access device association complete information to the cellular access device.

S213: The cellular access device receives the non-cellular access device association complete information sent by the UE.

Figure 10:
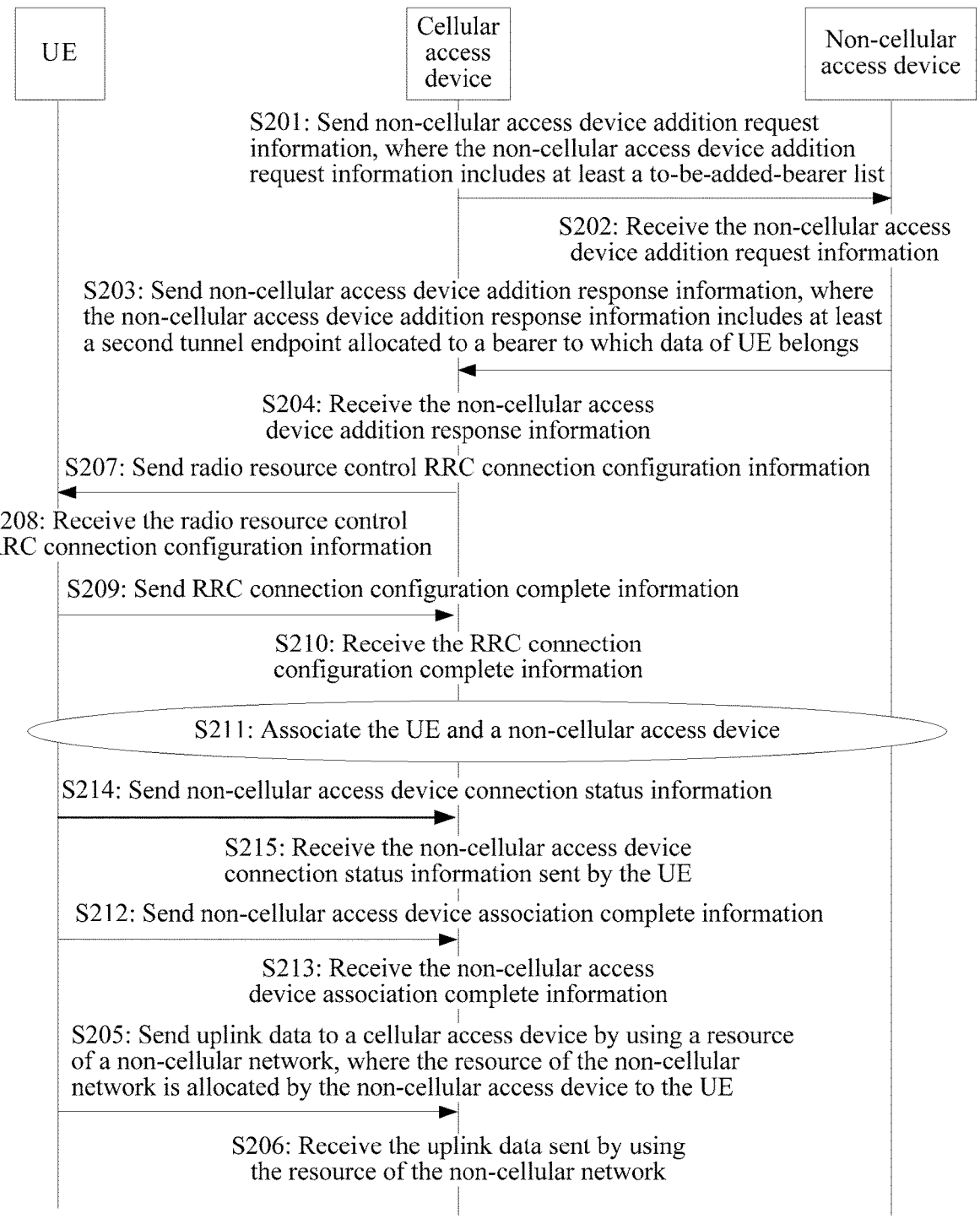
FIG. 10 is a schematic flowchart 3 of the data transmission method according to Embodiment 2 of the present invention.

Further, as shown in FIG. 10, before step S212 is performed, the data transmission method provided in this embodiment of the present invention may further include steps S214 and S215.

S214: The UE sends non-cellular access device connection status information to the cellular access device.

The non-cellular access device connection status information is used to indicate a connection status between the UE and the non-cellular access device.

S215: The cellular access device receives the non-cellular access device connection status information sent by the UE.

Specifically, the method described in steps S207 to S215 is the same as the method described in steps S107 to S115 in Embodiment 1. Details are not described herein again.

It needs to be added that the data transmission method provided in this embodiment of the present invention can be further applied to the configuration structure in which the protocol stacks of the eNB, the UE, and the WT include an LWAAP protocol layer shown in FIG. 3. In this case, for example, the cellular access device is an eNB, and the non-cellular access device is a WT. The foregoing step in which the user equipment UE sends uplink data to the cellular access device by using a resource of the non-cellular network is described.

After a DRB ID or an EPS bearer identifier is added to an uplink PDCP PDU offloaded by the UE by using an LWAAP protocol layer, an uplink LWAAP PDU (that is, a PDCP PDU to which an LWAAP is added) is sent to the WT. After receiving an uplink LWA PDU data packet, the WT first recognizes (that is, performs recognition by using the MAC address of the UE) the UE that sends the data packet, and next, finds, based on the DRB ID or the EPS bearer identifier in the LWAAP, an ERAB ID corresponding to the UE (if the to-be-added-bearer list does not include an ERAB ID, the step may be omitted, and a third TEID of a corresponding tunnel is directly found based on the DRB ID or the EPS bearer identifier in the LWAEP), so that the third TEID (where the third TEID is a TEID allocated by the eNB to a specific bearer during tunnel establishment) of the tunnel corresponding to the bearer may be found based on the ERAB ID; or finds the third TEID of the tunnel corresponding to the bearer based on the DRB ID or the EPS bearer identifier in the LWAAP. A GTP-U header is added, and the third TEID corresponding to the ERAB ID is filled in the header. A GTP-U tunnel corresponding to the ERAB ID is used to perform transmission. After data is transmitted to the eNB, if the GTP-U header includes the type number of the uplink transmission data, it is first recognized, based on a PDU type in the GTP-U header, whether the type number of the uplink transmission data is the type number of the uplink transmission data corresponding to the PDCP protocol. If the type number of the uplink transmission data is the type number of the uplink transmission data corresponding to the PDCP protocol, the GTP-U header is deleted. If the GTP-U header does not include the type number of the uplink transmission data, the GTP-U header is directly deleted. Next, information about the ERAB ID of the corresponding bearer is found based on the third TEID in the header, and a header of the LWAAP is then deleted. The PDCP PDU is sent to a PDCP entity corresponding to the bearer for processing.

For the data transmission method provided in this embodiment of the present invention, the method includes: sending, by the cellular access device, the non-cellular access device addition request information to the non-cellular access device, where the non-cellular access device addition request information is used to instruct the non-cellular access device to allocate the resource of the non-cellular network to the user equipment UE, the non-cellular access device addition request information includes at least the to-be-added-bearer list, and the to-be-added-bearer list includes a data radio bearer identifier DRB ID or an evolved packet system EPS bearer identifier; receiving, by the cellular access device, the non-cellular access device addition response information sent by the non-cellular access device, where the non-cellular access device addition response information includes at least the second tunnel endpoint allocated for a bearer to which data of the UE belongs, the second tunnel endpoint includes the second tunnel endpoint identifier TEID and the second transport layer address, and the second tunnel endpoint is used to indicate the data transmission destination in a downlink data transmission path; and receiving, by the cellular access device, the uplink data sent by the UE by using the resource of the non-cellular network. Based on the descriptions of the foregoing embodiments, the cellular access device sends the non-cellular access device addition request information used to instruct the non-cellular access device to allocate the resource of the non-cellular network to the UE to the non-cellular access device, so that the UE sends the uplink data to the cellular access device by using the allocated resource of the non-cellular network, thereby resolving a problem that only downlink data can be transmitted in an existing LWA technology.

Embodiment 3

Figure 11:
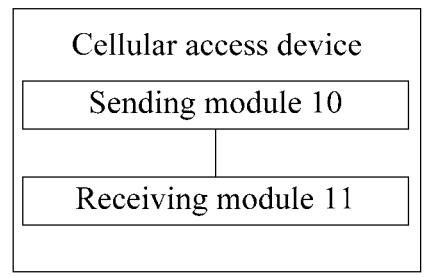
FIG. 11 is a schematic structural diagram of a cellular access device according to Embodiment 3 of the present invention.

This embodiment of the present invention provides a cellular access device. As shown in FIG. 11, the cellular access device is configured to perform the steps performed by the cellular access device in the foregoing method. The cellular access device may include modules corresponding to corresponding steps. For example, the modules may include a sending module 10 and a receiving module 11.

The sending module 10 is configured to send non-cellular access device addition request information to a non-cellular access device, where the non-cellular access device addition request information is used to instruct the non-cellular access device to allocate a resource of a non-cellular network to user equipment UE, the non-cellular access device addition request information includes at least a first tunnel endpoint allocated for the UE, the first tunnel endpoint includes a first tunnel endpoint identifier TEID and a first transport layer address, and the first tunnel endpoint is used to indicate a data transmission destination in an uplink data transmission path.

The receiving module 11 is configured to: after the sending module 10 sends the non-cellular access device addition request information to the non-cellular access device, receive non-cellular access device addition response information sent by the non-cellular access device, where the non-cellular access device addition response information includes at least a second tunnel endpoint allocated for a bearer to which data of the UE belongs, the second tunnel endpoint includes a second tunnel endpoint identifier TEID and a second transport layer address, and the second tunnel endpoint is used to indicate a data transmission destination in a downlink data transmission path; and receive uplink data sent by the UE by using the resource of the non-cellular network.

Optionally, the non-cellular access device addition request information further includes a media access control MAC address of the UE and a to-be-added-bearer list, the to-be-added-bearer list includes a third tunnel endpoint, a radio access bearer identifier ERAB ID, and a radio bearer service quality priority, the third tunnel endpoint includes a third TEID and a third transport layer address, the third tunnel endpoint is used to indicate a data transmission destination in data transmission for traffic control in uplink, and the radio bearer service quality priority is a quality of service QoS priority corresponding to radio bearer information.

Optionally, the non-cellular access device addition response information further includes an addible-bearer list, and the addible-bearer list includes a radio bearer identifier.

Optionally, the sending module 10 is further configured to: after the receiving module 11 receives the non-cellular access device addition response information sent by the non-cellular access device, and before the receiving module 11 receives the uplink data sent by the UE by using the resource of the non-cellular network, send radio resource control RRC connection configuration information to the UE, where the RRC connection configuration information includes Long Term Evolution-wireless local area network aggregation LWA configuration information.

The receiving module 11 is further configured to: after the sending module 10 sends the radio resource control RRC connection configuration information to the UE, receive RRC connection configuration complete information sent by the UE; and receive non-cellular access device association complete information sent by the UE.

Optionally, the receiving module 11 is further configured to: after the receiving module 11 receives the RRC connection configuration complete information sent by the UE, and before the receiving module receives the non-cellular access device association complete information sent by the UE, receive non-cellular access device connection status information sent by the UE, where the non-cellular access device connection status information is used to indicate a connection status between the UE and the non-cellular access device.

Optionally, a type Type of the uplink data that is received by the cellular access device and that is sent by the UE by using the resource of the non-cellular network is a type number of uplink transmission data corresponding to a PDCP protocol.

It may be understood that the cellular access device in this embodiment may correspond to the foregoing cellular access device in the data transmission method in the embodiment shown in any one of FIG. 5, FIG. 6, and FIG. 7. The division, functions, and/or the like of the modules in the cellular access device in this embodiment are all used to implement the method procedure shown in any one of FIG. 5, FIG. 6, and FIG. 7. For brevity, details are not described herein again.

Optionally, in another embodiment of the present invention, the function of the receiving module 11 may be implemented by using a receiver, and the function of the sending module 10 may be implemented by using a transmitter. The receiver and the transmitter may be integrated in one transceiver.

This embodiment of the present invention provides the cellular access device. Based on the descriptions of the foregoing embodiment, the cellular access device sends the non-cellular access device addition request information used to instruct the non-cellular access device to allocate the resource of the non-cellular network to the UE to the non-cellular access device, so that the UE sends the uplink data to the cellular access device by using the allocated resource of the non-cellular network, thereby resolving a problem that only downlink data can be transmitted in an existing LWA technology.

Embodiment 4

Figure 12:
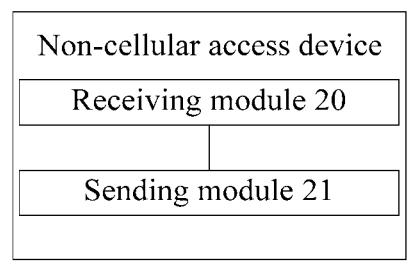
FIG. 12 is a schematic structural diagram of a non-cellular access device according to Embodiment 4 of the present invention.

This embodiment of the present invention provides a non-cellular access device. As shown in FIG. 12, the non-cellular access device is configured to perform the steps performed by the non-cellular access device in the foregoing method. The non-cellular access device may include modules corresponding to corresponding steps. For example, the modules include a receiving module 20 and a sending module 21.

The receiving module 20 is configured to receive non-cellular access device addition request information sent by a cellular access device, where the non-cellular access device addition request information is used to instruct the non-cellular access device to allocate a resource of a non-cellular network to user equipment UE, the non-cellular access device addition request information includes at least a first tunnel endpoint allocated for the UE, the first tunnel endpoint includes a first tunnel endpoint identifier TEID and a first transport layer address, and the first tunnel endpoint is used to indicate a data transmission destination in an uplink data transmission path.

The sending module 21 is configured to: after the receiving module 20 receives the non-cellular access device addition request information sent by the cellular access device, send non-cellular access device addition response information to the cellular access device, where the non-cellular access device addition response information includes at least a second tunnel endpoint allocated for a bearer to which data of the UE belongs, the second tunnel endpoint includes a second tunnel endpoint identifier TEID and a second transport layer address, and the second tunnel endpoint is used to indicate a data transmission destination in a downlink data transmission path.

Optionally, the non-cellular access device addition request information further includes a media access control MAC address of the UE and a to-be-added-bearer list, the to-be-added-bearer list includes a third tunnel endpoint, a radio access bearer identifier ERAB ID, and a radio bearer service quality priority, the third tunnel endpoint includes a third TEID and a third transport layer address, the third tunnel endpoint is used to indicate a data transmission destination in data transmission for traffic control in uplink, and the radio bearer service quality priority is a quality of service QoS priority corresponding to radio bearer information.

Optionally, the non-cellular access device addition response information further includes an addible-bearer list, and the addible-bearer list includes a radio bearer identifier.

It may be understood that the non-cellular access device in this embodiment may correspond to the foregoing non-cellular access device in the data transmission method in the embodiment shown in any one of FIG. 5, FIG. 6, and FIG. 7. The division, functions, and/or the like of the modules and the non-cellular access device in this embodiment are all used to implement the method procedure shown in any one of FIG. 5, FIG. 6, and FIG. 7. For brevity, details are not described herein again.

Optionally, in another embodiment of the present invention, the function of the receiving module 20 may be implemented by using a receiver, and the function of the sending module 21 may be implemented by using a transmitter. The receiver and the transmitter may be integrated in one transceiver.

This embodiment of the present invention provides the non-cellular access device. Based on the descriptions of the foregoing embodiment, the cellular access device sends the non-cellular access device addition request information used to instruct the non-cellular access device to allocate the resource of the non-cellular network to the UE to the non-cellular access device, so that the UE sends uplink data to the cellular access device by using the allocated resource of the non-cellular network, thereby resolving a problem that only downlink data can be transmitted in an existing LWA technology.

Embodiment 5

Figure 13:
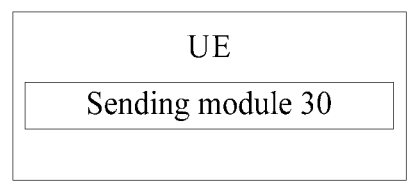
FIG. 13 is a schematic structural diagram 1 of UE according to Embodiment 5 of the present invention.

This embodiment of the present invention provides UE. As shown in FIG. 13, the UE is configured to perform the steps performed by the UE in the foregoing method. The UE may include modules corresponding to corresponding steps. For example, the modules include a sending module 30.

The sending module 30 is configured to send uplink data to a cellular access device by using a resource of a non-cellular network, where the resource of the non-cellular network is allocated by a non-cellular access device to the UE.

Figure 14:
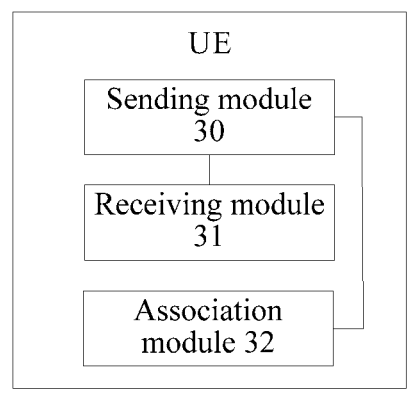
FIG. 14 is a schematic structural diagram 2 of the UE according to Embodiment 5 of the present invention.

Optionally, as shown in FIG. 14, the UE further includes a receiving module 31 and an association module 32.

The receiving module 31 is configured to: before the sending module 30 sends the uplink data to the cellular access device by using the resource of the non-cellular network, receive radio resource control RRC connection configuration information sent by the cellular access device, where the RRC connection configuration information includes Long Term Evolution-wireless local area network aggregation LWA configuration information.

The sending module 30 is further configured to: after the receiving module 31 receives the radio resource control RRC connection configuration information sent by the cellular access device, send RRC connection configuration complete information to the cellular access device.

The association module 32 is configured to associate the UE and the non-cellular access device.

The sending module 30 is further configured to: after the association module 32 associates the UE and the non-cellular access device, send non-cellular access device association complete information to the cellular access device.

Optionally, the sending module 30 is further configured to: after the sending module 30 sends the RRC connection configuration complete information to the cellular access device, and before the sending module 30 sends the non-cellular access device association complete information to the cellular access device, send non-cellular access device connection status information to the cellular access device, where the non-cellular access device connection status information is used to indicate a connection status between the UE and the non-cellular access device.

Optionally, a type Type of the uplink data sent by the UE by using the resource of the non-cellular network is a type number of uplink transmission data corresponding to a PDCP protocol.

It may be understood that the UE in this embodiment may be user equipment served by a cell of the foregoing cellular access device or non-cellular access device. The UE may correspond to the foregoing UE in the data transmission method in the embodiment shown in any one of FIG. 5 to FIG. 10. The division, functions, and/or the like of the modules and the UE in this embodiment are all used to implement the method procedure shown in any one of FIG. 5 to FIG. 10. For brevity, details are not described herein again.

Optionally, in another embodiment of the present invention, the function of the receiving module 31 may be implemented by using a receiver, the function of the sending module 30 may be implemented by using a transmitter, and the function of the association module 32 may be implemented by using a processor. The receiver and the transmitter may be integrated in one transceiver.

This embodiment of the present invention provides the UE. Based on the descriptions of the foregoing embodiments, the cellular access device sends the non-cellular access device addition request information used to instruct the non-cellular access device to allocate the resource of the non-cellular network to the UE to the non-cellular access device, so that the UE sends the uplink data to the cellular access device by using the allocated resource of the non-cellular network, thereby resolving a problem that only downlink data can be transmitted in an existing LWA technology.

Embodiment 6

Figure 15:
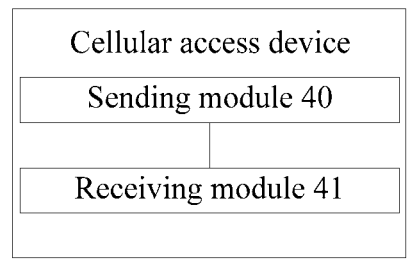
FIG. 15 is a schematic structural diagram of a cellular access device according to Embodiment 6 of the present invention.

This embodiment of the present invention provides a cellular access device. As shown in FIG. 15, the cellular access device is configured to perform the steps performed by the cellular access device in the foregoing method. The cellular access device may include modules corresponding to corresponding steps. For example, the modules may include a sending module 40 and a receiving module 41.

The sending module 40 is configured to send non-cellular access device addition request information to a non-cellular access device, where the non-cellular access device addition request information is used to instruct the non-cellular access device to allocate a resource of a non-cellular network to user equipment UE, the non-cellular access device addition request information includes at least a to-be-added-bearer list, and the to-be-added-bearer list includes a data radio bearer identifier DRB ID or an evolved packet system EPS bearer identifier.

The receiving module 41 is configured to: after the sending module 40 sends the non-cellular access device addition request information to the non-cellular access device, receive non-cellular access device addition response information sent by the non-cellular access device, where the non-cellular access device addition response information includes at least a second tunnel endpoint allocated for a bearer to which data of the UE belongs, the second tunnel endpoint includes a second tunnel endpoint identifier TEID and a second transport layer address, and the second tunnel endpoint is used to indicate a data transmission destination in a downlink data transmission path; and receive uplink data sent by the UE by using the resource of the non-cellular network.

Optionally, the non-cellular access device addition request information further includes a media access control MAC address of the UE, where the to-be-added-bearer list further includes a third tunnel endpoint, a radio access bearer identifier ERAB ID, and a radio bearer service quality priority, the third tunnel endpoint includes a third TEID and a third transport layer address, the third tunnel endpoint is used to indicate a data transmission destination in data transmission for traffic control in uplink, and the radio bearer service quality priority is a QoS priority corresponding to radio bearer information.

Optionally, the non-cellular access device addition response information further includes an addible-bearer list, and the addible-bearer list includes a radio bearer identifier.

Optionally, the sending module 40 is further configured to: after the receiving module 41 receives the non-cellular access device addition response information sent by the non-cellular access device, and before the receiving module 41 receives the uplink data sent by the UE by using the resource of the non-cellular network, send radio resource control RRC connection configuration information to the UE, where the RRC connection configuration information includes Long Term Evolution-wireless local area network aggregation LWA configuration information.

The receiving module 41 is further configured to: after the sending module 40 sends the radio resource control RRC connection configuration information to the UE, receive RRC connection configuration complete information sent by the UE; and receive non-cellular access device association complete information sent by the UE.

Optionally, the receiving module 41 is further configured to: after the receiving module 41 receives the RRC connection configuration complete information sent by the UE, and before the receiving module 41 receives the non-cellular access device association complete information sent by the UE, receive non-cellular access device connection status information sent by the UE, where the non-cellular access device connection status information is used to indicate a connection status between the UE and the non-cellular access device.

Optionally, a type Type of the uplink data that is received by the cellular access device and that is sent by the UE by using the resource of the non-cellular network is a type number of uplink transmission data corresponding to a PDCP protocol.

It may be understood that the cellular access device in this embodiment may correspond to the foregoing cellular access device in the data transmission method in the embodiment shown in any one of FIG. 8, FIG. 9, and FIG. 10. The division, functions, and/or the like of the modules and the cellular access device in this embodiment are all used to implement the method procedure shown in any one of FIG. 8, FIG. 9, and FIG. 10. For brevity, details are not described herein again.

Optionally, in another embodiment of the present invention, the function of the receiving module 41 may be implemented by using a receiver, and the function of the sending module 40 may be implemented by using a transmitter. The receiver and the transmitter may be integrated in one transceiver.

It should be noted that the cellular access device provided in Embodiment 6 and the cellular access device provided in Embodiment 3 may be cellular access devices of a same type. If the cellular access device provided in Embodiment 6 and the cellular access device provided in Embodiment 3 are cellular access devices of a same type, the cellular access device should have both the functions of the cellular access device provided in Embodiment 6 and the functions of the cellular access device provided in Embodiment 3, to implement the method procedure shown in any one of FIG. 5 to FIG. 10. The present invention is not limited thereto.

This embodiment of the present invention provides the cellular access device. Based on the descriptions of the foregoing embodiments, the cellular access device sends the non-cellular access device addition request information used to instruct the non-cellular access device to allocate the resource of the non-cellular network to the UE to the non-cellular access device, so that the UE sends the uplink data to the cellular access device by using the allocated resource of the non-cellular network, thereby resolving a problem that only downlink data can be transmitted in an existing LWA technology.

Embodiment 7

Figure 16:
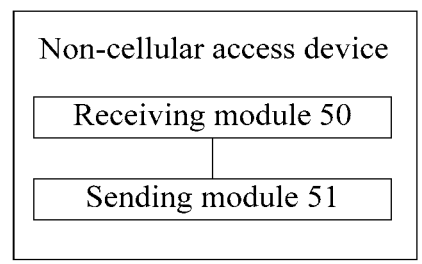
FIG. 16 is a schematic structural diagram of a non-cellular access device according to Embodiment 7 of the present invention.

This embodiment of the present invention provides a non-cellular access device. As shown in FIG. 16, the non-cellular access device is configured to perform the steps performed by the non-cellular access device in the foregoing method. The non-cellular access device may include modules corresponding to corresponding steps. For example, the modules include a receiving module 50 and a sending module 51.

The receiving module 50 is configured to receive non-cellular access device addition request information sent by a cellular access device, where the non-cellular access device addition request information is used to instruct the non-cellular access device to allocate a resource of a non-cellular network to user equipment UE, the non-cellular access device addition request information includes at least a to-be-added-bearer list, and the to-be-added-bearer list includes a data radio bearer identifier DRB ID or an evolved packet system EPS bearer identifier.

The sending module 51 is configured to: after the receiving module 50 receives the non-cellular access device addition request information sent by the cellular access device, send non-cellular access device addition response information to the cellular access device, where the non-cellular access device addition response information includes at least a second tunnel endpoint allocated for a bearer to which data of the UE belongs, the second tunnel endpoint includes a second tunnel endpoint identifier TEID and a second transport layer address, and the second tunnel endpoint is used to indicate a data transmission destination in a downlink data transmission path.

Optionally, the non-cellular access device addition request information further includes a media access control MAC address of the UE, the to-be-added-bearer list further includes the second tunnel endpoint, a radio access bearer identifier ERAB ID, and a radio bearer service quality priority, the second tunnel endpoint includes the second TEID and the second transport layer address, the second tunnel endpoint is used to indicate a data transmission destination in data transmission for data link layer traffic control in uplink, and the radio bearer service quality priority is a QoS priority corresponding to radio bearer information.

Optionally, the non-cellular access device addition response information further includes an addible-bearer list, and the addible-bearer list includes a radio bearer identifier.

It may be understood that the non-cellular access device in this embodiment may correspond to the foregoing non-cellular access device in the data transmission method in the embodiment shown in any one of FIG. 8, FIG. 9, and FIG. 10. The division, functions, and/or the like of the modules and the non-cellular access device in this embodiment are all used to implement the method procedure shown in any one of FIG. 8, FIG. 9, and FIG. 10. For brevity, details are not described herein again.

Optionally, in another embodiment of the present invention, the function of the receiving module 50 may be implemented by using a receiver, and the function of the sending module 51 may be implemented by using a transmitter. The receiver and the transmitter may be integrated in one transceiver.

It should be noted that the non-cellular access device provided in Embodiment 7 and the non-cellular access device provided in Embodiment 4 may be non-cellular access devices of a same type. If the non-cellular access device provided in Embodiment 7 and the non-cellular access device provided in Embodiment 4 are non-cellular access devices of a same type, the non-cellular access device should have both the functions of the non-cellular access device provided in Embodiment 7 and the functions of the non-cellular access device provided in Embodiment 4, to implement the method procedure shown in any one of FIG. 5 to FIG. 10. The present invention is not limited thereto.

This embodiment of the present invention provides the non-cellular access device. Based on the descriptions of the foregoing embodiment, the cellular access device sends the non-cellular access device addition request information used to instruct the non-cellular access device to allocate the resource of the non-cellular network to the UE to the non-cellular access device, so that the UE sends uplink data to the cellular access device by using the allocated resource of the non-cellular network, thereby resolving a problem that only downlink data can be transmitted in an existing LWA technology.

Embodiment 8

Figure 17:
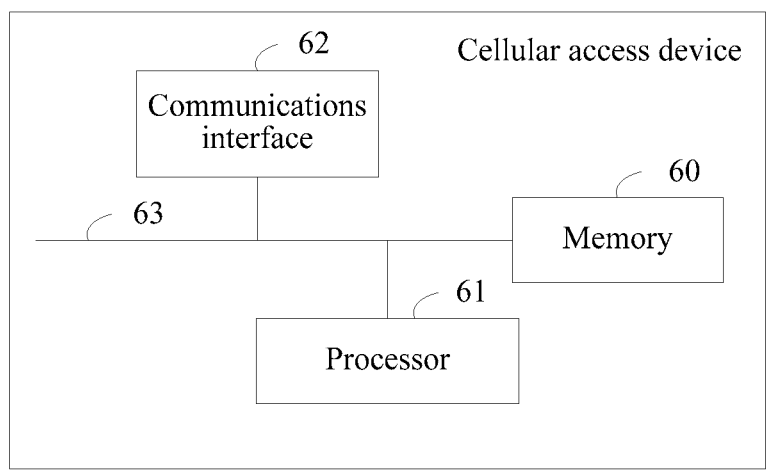
FIG. 17 is a schematic hardware diagram of a cellular access device according to Embodiment 8 of the present invention.

This embodiment of the present invention further provides a cellular access device. As shown in FIG. 17, the cellular access device includes a memory 60, a processor 61, a communications interface 62, and a system bus 63.

The memory 60, the processor 61, and the communications interface 62 are connected by using the system bus 63. The memory 60 is configured to store some computer instructions. The processor 61 is configured to perform the computer instructions, to enable the cellular access device to perform the data transmission method shown in any one of FIG. 5, FIG. 6, and FIG. 7, or, enable the cellular access device to perform the data transmission method shown in any one of FIG. 8, FIG. 9, and FIG. 10. For the specific data transmission method, refer to the related descriptions in the foregoing embodiment shown in any one of FIG. 5, FIG. 6, and FIG. 7 or the foregoing embodiment shown in any one of FIG. 8, FIG. 9, and FIG. 10. Details are not described herein again.

Further, the memory 60 is further configured to store an uplink data sending resource, where the uplink data sending resource is an uplink non-scheduled data sending resource or an uplink shared data sending resource.

The processor 61 may be a central processing unit (CPU). The processor 61 may be alternatively another general purpose processor, a digital signal processor (DSP), an application specific integrated circuit (ASIC), a field programmable gate array (FPGA) or another programmable logic device, a discrete gate or a transistor logic device, a discrete hardware component, or the like. The general purpose processor may be a microprocessor or the processor may be any conventional processor, or the like.

The processor 61 may be a dedicated processor. The dedicated processor may include at least one of a baseband processing chip, a radio frequency processing chip, and the like. Further, the dedicated processor may further include a chip having other dedicated processing functions of the cellular access device.

The memory 60 may include a volatile memory, for example, a random-access memory (RAM). The memory 60 may alternatively include a non-volatile memory, for example, a read-only memory (ROM), a flash memory, a hard disk drive (HDD) or a solid-state drive (SSD). The memory 60 may alternatively include a combination of the foregoing types of memories.

The system bus 63 may include a data bus, a power supply bus, a control bus, and a signal status bus. In this embodiment, for a purpose of clear description, all buses are marked as the system bus 63 in FIG. 17.

The communications interface 62 may include a receiver and a transmitter. In addition, during specific implementation of the cellular access device, the receiver and the transmitter may be specifically a transceiver on the cellular access device. The transceiver may be a radio transceiver. For example, the radio transceiver may be an antenna or the like on the cellular access device. The processor 61 receives data from and transmits data to another device such as a non-cellular access device by using a transceiver.

During specific implementation, the steps in the foregoing method procedure shown in any one of FIG. 5, FIG. 6, and FIG. 7 or the foregoing method procedure shown in any one of FIG. 8, FIG. 9, and FIG. 10 may all be implemented by hardware executing a computer execution instruction in a software form. To avoid repetition, no details are provided herein.

This embodiment of the present invention provides the cellular access device. Based on the descriptions of the foregoing embodiment, the cellular access device sends non-cellular access device addition request information used to instruct the non-cellular access device to allocate a resource of a non-cellular network to UE to the non-cellular access device, so that the UE sends uplink data to the cellular access device by using an allocated resource of the non-cellular network, thereby resolving a problem that only downlink data can be transmitted in an existing LWA technology.

Embodiment 9

Figure 18:
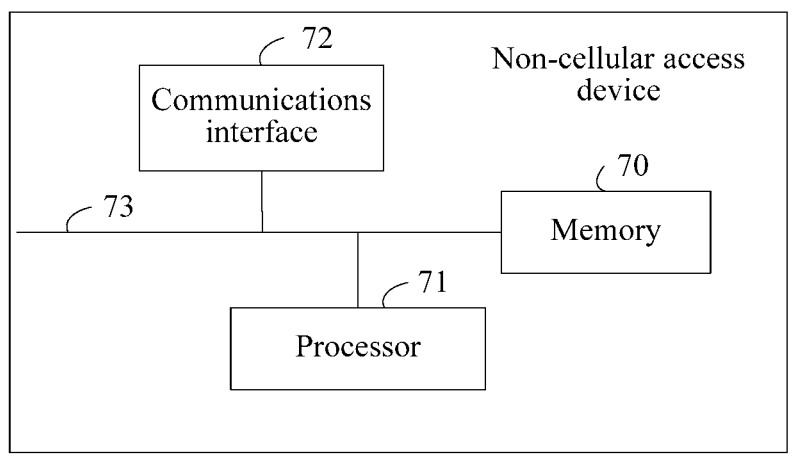
FIG. 18 is a schematic hardware diagram of a non-cellular access device according to Embodiment 9 of the present invention.

This embodiment of the present invention further provides a non-cellular access device. As shown in FIG. 18, the non-cellular access device includes a memory 70, a processor 71, a communications interface 72, and a system bus 73.

The memory 70, the processor 71, and the communications interface 72 are connected by using the system bus 73. The memory 70 is configured to store some computer instructions. The processor 71 is configured to perform the computer instructions, to enable the non-cellular access device to perform the data transmission method shown in any one of FIG. 5, FIG. 6, and FIG. 7, or, enable the non-cellular access device to perform the data transmission method shown in any one of FIG. 8, FIG. 9, and FIG. 10. For the specific data transmission method, refer to related descriptions of the foregoing embodiment shown in any one of FIG. 5, FIG. 6, and FIG. 7 or the foregoing embodiment shown in any one of FIG. 8, FIG. 9, and FIG. 10. Details are not described herein again.

Further, the memory 70 is further configured to store an uplink data sending resource, where the uplink data sending resource is an uplink non-scheduled data sending resource or an uplink shared data sending resource.

The processor 71 may be a CPU. Alternatively, the processor 71 may be another general purpose processor, a DSP, an ASIC, an FPGA or another programmable logical device, a discrete gate or a transistor logical device, or a discrete hardware component. The general purpose processor may be a microprocessor or the processor may be any conventional processor, or the like.

The processor 71 may be a dedicated processor. The dedicated processor may include at least one of a baseband processing chip, a radio frequency processing chip, and the like. Further, the dedicated processor may further include a chip having other dedicated processing functions of the non-cellular access device.

The memory 70 may include a volatile memory, for example, a RAM. The memory 70 may alternatively include a non-volatile memory, for example, a ROM, a flash memory, an HDD or an SSD. The memory 70 may alternatively include a combination of the foregoing types of memories.

The system bus 73 may include a data bus, a power supply bus, a control bus, and a signal status bus. In this embodiment, for a purpose of clear description, all buses are marked as the system bus 73 in FIG. 18.

The communications interface 72 may include a receiver and a transmitter. In addition, during specific implementation of the non-cellular access device, the receiver and the transmitter may be specifically a transceiver on the non-cellular access device. The transceiver may be a radio transceiver. For example, the radio transceiver may be an antenna or the like on the non-cellular access device. The processor 71 receives data from and transmits data to another device such as a cellular access device by using a transceiver.

During specific implementation, the steps in the foregoing method procedure shown in any one of FIG. 5, FIG. 6, and FIG. 7 or the foregoing method procedure shown in any one of FIG. 8, FIG. 9, and FIG. 10 may all be implemented by hardware executing a computer execution instruction in a software form. To avoid repetition, no details are provided herein.

This embodiment of the present invention provides the non-cellular access device. Based on the descriptions of the foregoing embodiment, the cellular access device sends non-cellular access device addition request information used to instruct the non-cellular access device to allocate a resource of a non-cellular network to UE to the non-cellular access device, so that the UE sends uplink data to the cellular access device by using an allocated resource of the non-cellular network, thereby resolving a problem that only downlink data can be transmitted in an existing LWA technology.

Embodiment 10

Figure 19:
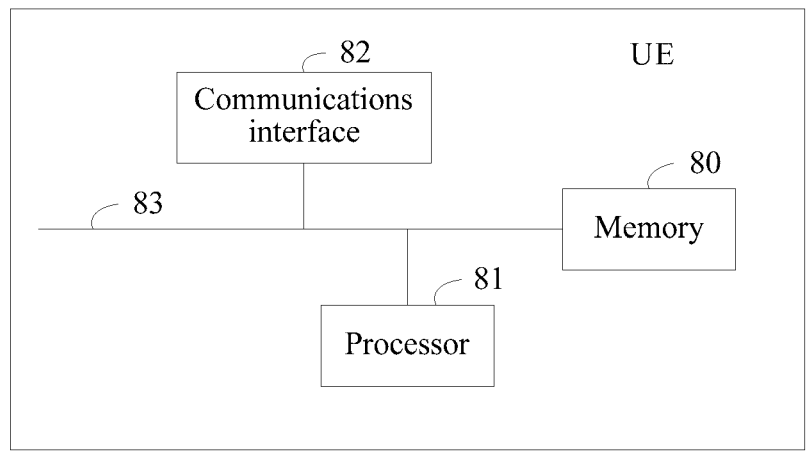
FIG. 19 is a schematic hardware diagram of UE according to Embodiment 10 of the present invention.

This embodiment of the present invention further provides UE. As shown in FIG. 19, the UE includes a memory 80, a processor 81, a communications interface 82, and a system bus 83.

The memory 80, the processor 81, and the communications interface 82 are connected by using the system bus 83. The memory 80 is configured to store some computer instructions. The processor 81 is configured to perform the computer instructions, to enable the UE to perform the data transmission method shown in any one of FIG. 5 to FIG. 10. For the specific data transmission method, refer to the related descriptions of the foregoing embodiment shown in any one of FIG. 5 to FIG. 10. Details are not described herein again.

Further, the memory 80 is further configured to store an uplink data sending resource, where the uplink data sending resource is an uplink non-scheduled data sending resource or an uplink shared data sending resource.

The processor 81 may be a CPU. Alternatively, the processor 81 may be another general purpose processor, a DSP, an ASIC, an FPGA or another programmable logical device, a discrete gate or a transistor logical device, or a discrete hardware component. The general purpose processor may be a microprocessor or the processor may be any conventional processor, or the like.

The processor 81 may be a dedicated processor. The dedicated processor may include at least one of a baseband processing chip, a radio frequency processing chip, and the like. Further, the dedicated processor may further include a chip having other dedicated processing functions of the UE.

The memory 80 may include a volatile memory, for example, a RAM. The memory 80 may alternatively include a non-volatile memory, for example, a ROM, a flash memory, an HDD or an SSD. The memory 80 may alternatively include a combination of the foregoing types of memories.

The system bus 83 may include a data bus, a power supply bus, a control bus, and a signal status bus. In this embodiment, for a purpose of clear description, all buses are marked as the system bus 83 in FIG. 19.

The communications interface 82 may include a receiver and a transmitter. In addition, during specific implementation of the UE, a receiver and a transmitter may be specifically a transceiver on the UE. The transceiver may be a radio transceiver. For example, the radio transceiver may be an antenna or the like of the UE. The processor 81 receives data from or transmits data to another device such as a cellular access device or a non-cellular access device by using the transceiver.

During specific implementation, the steps in the foregoing method procedure shown in any one of FIG. 5 to FIG. 10 may be implemented by hardware executing a computer execution instruction in a software form. To avoid repetition, no details are provided herein.

This embodiment of the present invention provides the UE. Based on the descriptions of the foregoing embodiments, the cellular access device sends non-cellular access device addition request information used to instruct the non-cellular access device to allocate a resource of a non-cellular network to the UE to the non-cellular access device, so that the UE sends uplink data to the cellular access device by using an allocated resource of the non-cellular network, thereby resolving a problem that only downlink data can be transmitted in an existing LWA technology.

Embodiment 11

This embodiment of the present invention provides a data transmission system. The system includes a cellular access device, a non-cellular access device, and UE. For descriptions of the cellular access device, refer to related descriptions of the foregoing cellular access device in Embodiment 3, Embodiment 6, and Embodiment 8 for details. For descriptions of the non-cellular access device, refer to related descriptions of the foregoing non-cellular access device in Embodiment 4, Embodiment 7, and Embodiment 9 for details. For descriptions of the UE, refer to related descriptions of the foregoing UE in Embodiment 5 and Embodiment 10. Details are not described herein again for details.

In the data transmission system provided in this embodiment of the present invention, the cellular access device completes the data transmission method in this embodiment of the present invention by performing corresponding steps in the method procedure shown in any one of FIG. 5 to FIG. 10. Correspondingly, the non-cellular access device completes the data transmission method in this embodiment of the present invention by performing corresponding steps in the method procedure shown in any one of FIG. 5 to FIG. 10. The UE completes the data transmission method in this embodiment of the present invention by performing corresponding steps in the method procedure shown in any one of FIG. 5 to FIG. 10.

It may be clearly understood by persons skilled in the art that, for the purpose of convenient and brief description, division of the foregoing functional modules is taken as an example for illustration. In actual application, the foregoing functions can be allocated to different functional modules and implemented according to a requirement, that is, an inner structure of an apparatus is divided into different functional modules to implement all or part of the functions described above. For a detailed working process of the foregoing system, apparatus, and unit, reference may be made to a corresponding process in the foregoing method embodiments, and details are not described herein.

In the several embodiments provided in this application, it should be understood that the disclosed apparatus and method may be implemented in other manners. For example, the described apparatus embodiment is only an example. For example, the module or unit division is only logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be allocated on a plurality of network units. Some or all of the units may be selected according to actual needs to achieve the destinations of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or a part of the technical solutions may be implemented in the form of a software product. The software product is stored in a storage medium and includes several instructions for instructing a computer device (which may be a personal computer, a server, or a network device) or the processor to perform all or a part of the steps of the methods described in the embodiments of the present invention. The foregoing storage medium includes: any medium that can store program code, such as a USB flash drive, a removable hard disk, a read-only memory (ROM), a random-access memory (RAM), a magnetic disk, or an optical disc.

The descriptions are only specific implementations of the present invention, but are not intended to limit the protection scope of the present invention. Any variation or replacement readily figured out by persons skilled in the art within the technical scope disclosed in the present invention shall fall within the protection scope of the present invention. Therefore, the protection scope of the present invention shall be subject to the protection scope of the claims.

What is claimed is:

1. A data transmission method, comprising:
   sending, by a cellular access device, non-cellular access device addition request information to a non-cellular access device, wherein the non-cellular access device addition request information is used to instruct the non-cellular access device to allocate a resource of a non-cellular network for a terminal, the non-cellular access device addition request information comprises a to-be-added-bearer list, and the to-be-added-bearer list comprises a data radio bearer identifier (DRB ID);
   receiving, by the cellular access device, non-cellular access device addition response information from the non-cellular access device, wherein the non-cellular access device addition response information comprises a tunnel endpoint allocated for a bearer to which data of the terminal belongs, the tunnel endpoint comprises a tunnel endpoint identifier, TEID, and a transport layer address, and the tunnel endpoint is used to indicate a data transmission destination in a downlink data transmission path; and
   receiving, by the cellular access device, through the non-cellular access device, uplink data from the terminal, the uplink data comprises a long term evolution wireless local area network aggregation adaptation protocol protocol data unit (LWAAP PDU), wherein the LWAAP PDU comprises the DRB ID.

2. The data transmission method according to claim 1, wherein the to-be-added-bearer list comprises an evolved universal terrestrial radio access network radio access bearer identifier (ERAB ID), and the DRB ID is used by the non-cellular access device for finding the ERAB ID which is corresponding to the terminal.

3. The data transmission method according to claim 1, wherein the DRB ID is used by the non-cellular access device for finding a tunnel endpoint which is corresponding to the DRB ID.

4. The data transmission method according to claim 1, wherein the non-cellular access device addition request information further comprises: a media access control (MAC) address, wherein the MAC address is used by the non-cellular access device for identifying the terminal that sends the uplink data.

5. The data transmission method according to claim 2, wherein a tunnel endpoint corresponding to the DRB ID is found based on the ERAB ID.

6. A data transmission method, comprising:
   receiving, by a non-cellular access device, non-cellular access device addition request information from a cellular access device, wherein the non-cellular access device addition request information is used to instruct the non-cellular access device to allocate a resource of a non-cellular network for a terminal, the non-cellular access device addition request information comprises a to-be-added-bearer list, and the to-be-added-bearer list comprises a data radio bearer identifier (DRB ID);
   sending, by the non-cellular access device, non-cellular access device addition response information to the cellular access device, wherein the non-cellular access device addition response information comprises a tunnel endpoint allocated for a bearer to which data of the terminal belongs, the tunnel endpoint comprises a tunnel endpoint identifier (TEID) and a transport layer address, and the tunnel endpoint is used to indicate a data transmission destination in a downlink data transmission path; and,
   receiving, by the non-cellular access device, uplink data from the terminal, the uplink data comprises a long term evolution wireless local area network aggregation adaptation protocol protocol data unit (LWAAP PDU), wherein the LWAAP PDU comprises the DRB ID.

7. The data transmission method according to claim 6, wherein the to-be-added-bearer list comprises an evolved universal terrestrial radio access network radio access bearer identifier ERAB ID), and the DRB ID is used by the non-cellular access device for finding the ERAB ID which is corresponding to the terminal.

8. The data transmission method according to claim 6, wherein the DRB ID is used by the non-cellular access device for finding a tunnel endpoint corresponding to the DRB ID.

9. The data transmission method according to claim 6, wherein the non-cellular access device addition request information further comprises: a media access control (MAC) address, wherein the MAC address is used by the non-cellular access device for identifying the terminal that sends the uplink data.

10. The data transmission method according to claim 7, wherein a tunnel endpoint corresponding to the DRB ID is found based on the ERAB ID.

11. An apparatus, comprising a transmitter and a receiver, wherein:

the transmitter is configured to send non-cellular access device addition request information to a non-cellular access device, wherein the non-cellular access device addition request information is used to instruct the non-cellular access device to allocate a resource of a non-cellular network for a terminal, the non-cellular access device addition request information comprises a to-be-added-bearer list, and the to-be-added-bearer list comprises a data radio bearer identifier (DRB ID);

the receiver is configured to receive non-cellular access device addition response information from the non-cellular access device, wherein the non-cellular access device addition response information comprises a tunnel endpoint allocated for a bearer to which data of the terminal belongs, the tunnel endpoint comprises a tunnel endpoint identifier (TEID) and a transport layer address, and the tunnel endpoint is used to indicate a data transmission destination in a downlink data transmission path; and the receiver is further configured to receive uplink data, through the non-cellular access device, from the terminal, the uplink data comprises a long term evolution wireless local area network aggregation adaptation protocol protocol data unit (LWAAP PDU), wherein the LWAAP PDU comprises the DRB ID.

12. The apparatus according to claim 11, wherein the to-be-added-bearer list comprises an evolved universal terrestrial radio access network radio access bearer identifier (ERAB ID), and the DRB ID is used by the non-cellular access device for finding the ERAB ID which is corresponding to the terminal.

13. The apparatus according to claim 11, wherein the DRB ID is used by the non-cellular access device for finding a tunnel endpoint corresponding to the DRB ID.

14. The apparatus according to claim 11, wherein the non-cellular access device addition request information further comprises: a media access control (MAC) address, wherein the MAC address is used by the non-cellular access device for identifying the terminal that sends the uplink data.

15. The apparatus according to claim 12, wherein a tunnel endpoint corresponding to the DRB ID is found based on the ERAB ID.

16. An apparatus, comprising a receiver and a transmitter, wherein:

the receiver is configured to receive non-cellular access device addition request information from a cellular access device, wherein the non-cellular access device addition request information is used to instruct the non-cellular access device to allocate a resource of a non-cellular network for a terminal, the non-cellular access device addition request information comprises a to-be-added-bearer list, and the to-be-added-bearer list comprises a data radio bearer identifier (DRB ID);

the transmitter is configured to send non-cellular access device addition response information to the cellular access device, wherein the non-cellular access device addition response information comprises a tunnel endpoint allocated for a bearer to which data of the terminal belongs, the tunnel endpoint comprises a tunnel endpoint identifier (TEID) and a transport layer address, and the tunnel endpoint is used to indicate a data transmission destination in a downlink data transmission path; and the receiver is further configured to receive uplink data from the terminal, the uplink data comprises a long term evolution wireless local area network aggregation adaptation protocol protocol data unit (LWAAP PDU), wherein the LWAAP PDU comprises the DRB ID.

17. The apparatus according to claim 16, wherein the to-be-added-bearer list further comprises an evolved universal terrestrial radio access network radio access bearer identifier (ERAB ID), and the DRB ID is used by the non-cellular access device for finding the ERAB ID which is corresponding to the terminal.

18. The apparatus according to claim 16, wherein the DRB ID is used by the non-cellular access device for finding a tunnel endpoint corresponding to the DRB ID.

19. The apparatus according to claim 16, wherein the non-cellular access device addition request information further comprises: a media access control (MAC) address, wherein the MAC address is used by the non-cellular access device for identifying the terminal that sends the uplink data.

20. The apparatus according to claim 17, wherein a tunnel endpoint corresponding to the DRB ID is found based on the ERAB ID.

* * * * *